(12) United States Patent
Mundhenk et al.

(10) Patent No.: US 9,811,880 B2
(45) Date of Patent: Nov. 7, 2017

(54) BACKFILLING POINTS IN A POINT CLOUD

(71) Applicant: The Boeing Company, Chicago, IL (US)

(72) Inventors: Terrell Nathan Mundhenk, Calabasas, CA (US); Yuri Owechko, Newbury Park, CA (US); Kyungnam Kim, Oak Park, CA (US)

(73) Assignee: THE BOEING COMPANY, Chicago, IL (US)

( * ) Notice: Subject to any disclaimer, the term of this patent is extended or adjusted under 35 U.S.C. 154(b) by 443 days.

(21) Appl. No.: 13/673,429

(22) Filed: Nov. 9, 2012

(65) Prior Publication Data

US 2014/0132733 A1    May 15, 2014

(51) Int. Cl.

| H04N 7/18 | (2006.01) |
|---|---|
| G06T 3/40 | (2006.01) |
| H04N 13/00 | (2006.01) |
| G06T 5/00 | (2006.01) |
| H04N 13/02 | (2006.01) |
| G06T 17/00 | (2006.01) |

(52) U.S. Cl.
CPC .......... G06T 3/4007 (2013.01); G06T 3/4038 (2013.01); G06T 5/002 (2013.01); G06T 17/00 (2013.01); H04N 13/0022 (2013.01); H04N 13/025 (2013.01); G06T 2210/56 (2013.01)

(58) Field of Classification Search
CPC ..... G06T 3/4038; G06T 5/002; G06T 7/0057; H04N 13/0022; H04N 13/025
USPC ...... 348/140, 43, 46, 47; 356/4.01; 382/285, 382/154, 284, 260
See application file for complete search history.

(56) References Cited

U.S. PATENT DOCUMENTS

| 7,363,157 | B1 | 4/2008 | Hanna et al. | |
|---|---|---|---|---|
| 2007/0031064 | A1* | 2/2007 | Zhao et al. | 382/285 |
| 2008/0112610 | A1 | 5/2008 | Israelsen et al. | |
| 2010/0034483 | A1* | 2/2010 | Giuffrida | G06T 3/4038 382/284 |
| 2011/0025827 | A1* | 2/2011 | Shpunt | G06T 7/0057 348/47 |

(Continued)

FOREIGN PATENT DOCUMENTS

| CN | 101377404 A | 3/2009 |
|---|---|---|
| CN | 102129708 A | 7/2011 |

(Continued)

OTHER PUBLICATIONS

Rosenthal et al., "Image-Space Point Cloud Rendering," Proceedings of Computer Graphics International, Jun. 2008.*

(Continued)

*Primary Examiner* — Jorge L Ortiz Criado
*Assistant Examiner* — Daniel Chang
(74) *Attorney, Agent, or Firm* — Yee & Associates, P.C.

(57) ABSTRACT

An apparatus, system, and method for increasing points in a point cloud. In one illustrative embodiment, a two-dimensional image of a scene and the point cloud of the scene are received. At least a portion of the points in the point cloud are mapped to the two-dimensional image to form transformed points. A fused data array is created using the two-dimensional image and the transformed points. New points for the point cloud are identified using the fused data array. The new points are added to the point cloud to form a new point cloud.

17 Claims, 13 Drawing Sheets

(56) References Cited

U.S. PATENT DOCUMENTS

| | | | | |
|---|---|---|---|---|
| 2011/0274366 A1* | 11/2011 | Tardif | ................... | G06T 5/002 382/260 |
| 2012/0056982 A1* | 3/2012 | Katz | ................... | H04N 13/025 348/43 |
| 2012/0081544 A1* | 4/2012 | Wee | ................... | 348/140 |
| 2012/0293624 A1* | 11/2012 | Chen | ................... | H04N 13/0022 348/46 |
| 2014/0118716 A1* | 5/2014 | Kaganovich | ................... | 356/4.01 |

FOREIGN PATENT DOCUMENTS

| | | |
|---|---|---|
| CN | 102447911 A | 5/2012 |
| EP | 2442134 A1 | 4/2012 |
| WO | 2006083297 A2 | 8/2006 |

OTHER PUBLICATIONS

Xu et al., "Stereo Matching: An Outlier Confidence Approach," 10th European Conference on Computer Vision, Marseille, France, Oct. 12, 2008, pp. 775-787.*

English Translation of Notice of Reasons for Rejection, regarding Japanese Patent Application No. 2013-231790, dated Oct. 7, 2014, 1 pages.

Canadian Intellectual Property Office Examination Search Report, dated Mar. 6, 2015, regarding Application No. 2,826,534, 5 pages.

European Search Report, dated Mar. 20, 2014, regarding Application No. EP13190777.6, 10 pages.

Toth et al., "Integration of LIDAR Data with Simultaneously Acquired Digital Imagery," Proceedings: ASPRS 2001: Gateway to the New Millennium, Apr. 2001, 14 pages.

Chalmoviansky et al., "Filling Holes in Point Clouds," Mathematics of Surfaces, Proceedings of the 10th IMA International Conference, LNCS vol. 2768, Sep. 2003, 18 pages.

Davis et al., "Filling Holes in Complex Surfaces using Volumetric Diffusion," Proceedings of the First International Symposium on 3D Processing, Visualization, Transmission, Jun. 2002, 11 pages.

Friedman et al., "Online Facade Reconstruction from Dominant Frequencies in Structured Point Clouds,"Proceedings of the IEEE Computer Society Conference on Computer Vision and Pattern Recognition, Jun. 2012, 8 pages.

Li et al., "Filling the Holes of 3D Body Scan Line Point Cloud," Proceedings of the 2010 2nd International Conference on Advanced Computer Control (ICACC), vol. 4, Mar. 2010, pp. 334-338.

Moreno-Noguer et al., "Accurate Non-Iterative O(n) Solution to the PnP Problem", Proceedings of the IEEE International Conference on Computer Vision (ICCV), Oct. 2007, 8 pages.

Rosenthal et al., "Image-Space Point Cloud Rendering", Proceedings of Computer Graphics International, Jun. 2008, 8 pages.

European Patent Office Communication, dated Feb. 10, 2016, regarding Application No. 13190777.6, 6 pages.

Canadian Office Action dated Feb. 24, 2016, regarding application No. 2826534, 6 pages.

European Patent Office Communication, dated Jul. 15, 2015, regarding Application No. 13190777.6, 7 pages.

Patent Office of the Cooperation Council for the Arab States of the Gulf Examination Report and English Translation, dated Dec. 15, 2016, regarding Application No. GC2013-25750, 5 pages.

European Patent Office Communication, dated Apr. 7, 2017, regarding Application No. 13190777.6, 8 pages.

State Intellectual Property Office of the PRC Search Report, dated May 5, 2017, regarding Application No. 2013105566622, 24 pages.

* cited by examiner

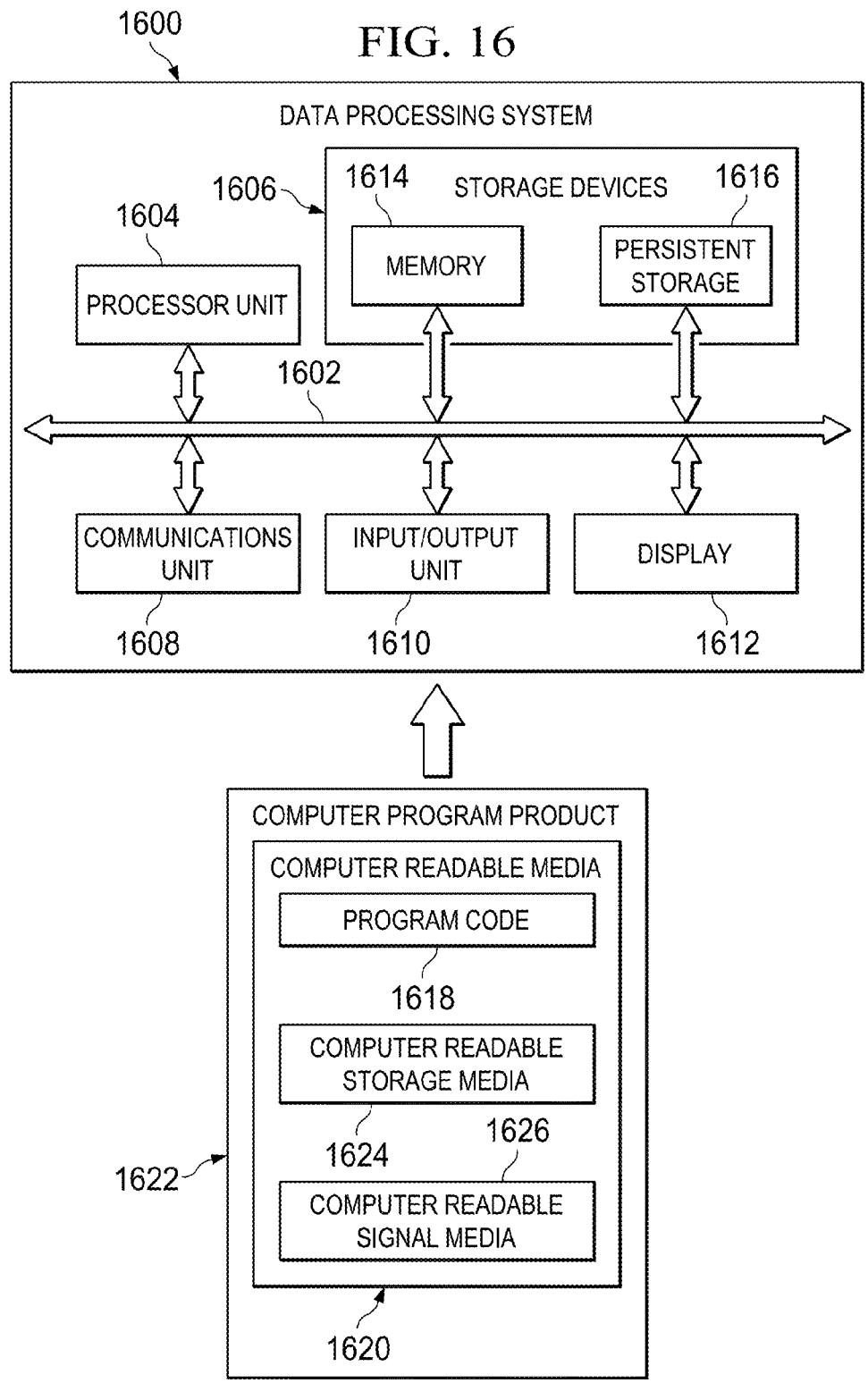

BACKFILLING POINTS IN A POINT CLOUD

BACKGROUND INFORMATION

1. Field

The present disclosure relates generally to point clouds and, in particular, to increasing the resolution of point clouds. Still more particularly, the present disclosure relates to a system and method for increasing the number of points in a point cloud to increase the resolution of the point cloud.

2. Background

A point cloud is a collection of points in a three-dimensional (3D) coordinate system that describe a three-dimensional scene. Typically, the points in a point cloud represent external surfaces of objects. A light detection and ranging (LIDAR) system is an example of one type of sensor system capable of generating a point cloud. Point clouds may also be generated using, for example, stereo camera systems, mobile laser imaging systems, and other types of sensor systems.

Point clouds may be used for performing various operations such as, for example, object identification, object classification, scene visualization, segmentation, two-dimensional image data enhancement, and/or other types of operations. The level of performance with which these operations are performed using a point cloud may depend on the resolution of that point cloud.

As used herein, the "resolution" of a point cloud may be the level of detail with which features in the scene captured by the point cloud may be discernible within the point cloud. The resolution of a point cloud may depend on the number of points in the point cloud and/or the point density of the points in one or more portions of the point cloud. As used herein, "point density" is a measure of the number of points per unit volume. A portion of a point cloud having a higher density than another portion of the point cloud may be less sparse than the other portion.

In some situations, object identification, object classification, segmentation, and/or visualization of a scene using a sparse point cloud may yield inaccurate results. For example, a point cloud may be insufficiently dense to correctly identify or classify an object.

Some currently available solutions for increasing the number of points in a point cloud include making assumptions about the objects in the scene. For example, assumptions may be made about the shape of an object in the scene and new points may be added to the point cloud based on those assumptions. However, with these types of solutions, the locations in the three-dimensional reference coordinate system at which the new points are added may be less accurate than desired.

Further, some currently available solutions may be unable to account for actual holes or gaps in a scene. For example, with some currently available solutions, new points may be added to a point cloud at locations that represent actual holes or gaps in the scene. Still further, some currently available solutions may add points to a point cloud that connect objects that are unconnected in the scene, such as, for example, a tree top and the ground. Therefore, it would be desirable to have a method and apparatus that takes into account at least some of the issues discussed above, as well as other possible issues.

SUMMARY

In one illustrative embodiment, an apparatus comprises an image processing system. The image processing system is configured to map at least a portion of points in a point cloud of a scene to a two-dimensional image of the scene to form transformed points. The image processing system is configured to create a fused data array using the two-dimensional image and the transformed points. Further, the image processing system is configured to identify new points for the point cloud using the fused data array and add the new points to the point cloud to form a new point cloud.

In another illustrative embodiment, an image processing system comprises a fusion manager, a depth value generator, and a point cloud manager. The fusion manager is configured to map at least a portion of points in a point cloud of a scene to a two-dimensional image of the scene to form transformed points and configured to create a fused data array using the two-dimensional image and the transformed points. The fused data array includes matched elements associated with filled data vectors comprising non-null depth values and unmatched elements associated with unfilled data vectors comprising null depth values. The depth value generator is configured to identify new depth values to replace at least a portion of the null depth values. The point cloud manager is configured to identify new points for the point cloud using the new depth values and add the new points to the point cloud to form a new point cloud.

In yet another illustrative embodiment, a computer-implemented method for increasing a number of points in a point cloud is provided. A two-dimensional image of a scene and the point cloud of the scene are received. At least a portion of the points in the point cloud are mapped to the two-dimensional image to form transformed points. A fused data array is created using the two-dimensional image and the transformed points. New points for the point cloud are identified using the fused data array. The new points are added to the point cloud to form a new point cloud.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 16 is an illustration of a data processing system in the form of a block diagram in accordance with an illustrative embodiment.

DETAILED DESCRIPTION

The different illustrative embodiments recognize and take into account different considerations. For example, the illustrative embodiments recognize and take into account that it may be desirable to have a method for increasing the number of points in a point cloud by adding new points to locations in the three-dimensional reference coordinate system for the point cloud that have a desired level of accuracy.

Further, the illustrative embodiments recognize and take into account that a two-dimensional image of the same scene captured by a point cloud may be used to increase the number of points in a point cloud. However, the illustrative embodiments recognize and take into account that it may be desirable to process the two-dimensional image to increase the number of points in the point cloud without making assumptions about the scene and/or the shapes of objects in the scene captured in the two-dimensional image.

Thus, the illustrative embodiments provide a system and method for increasing the number of points in a point cloud of a scene using a two-dimensional image of the scene. Further, this system and method may increase the number of points in the point cloud without making any assumptions about the scene.

Figure 1:
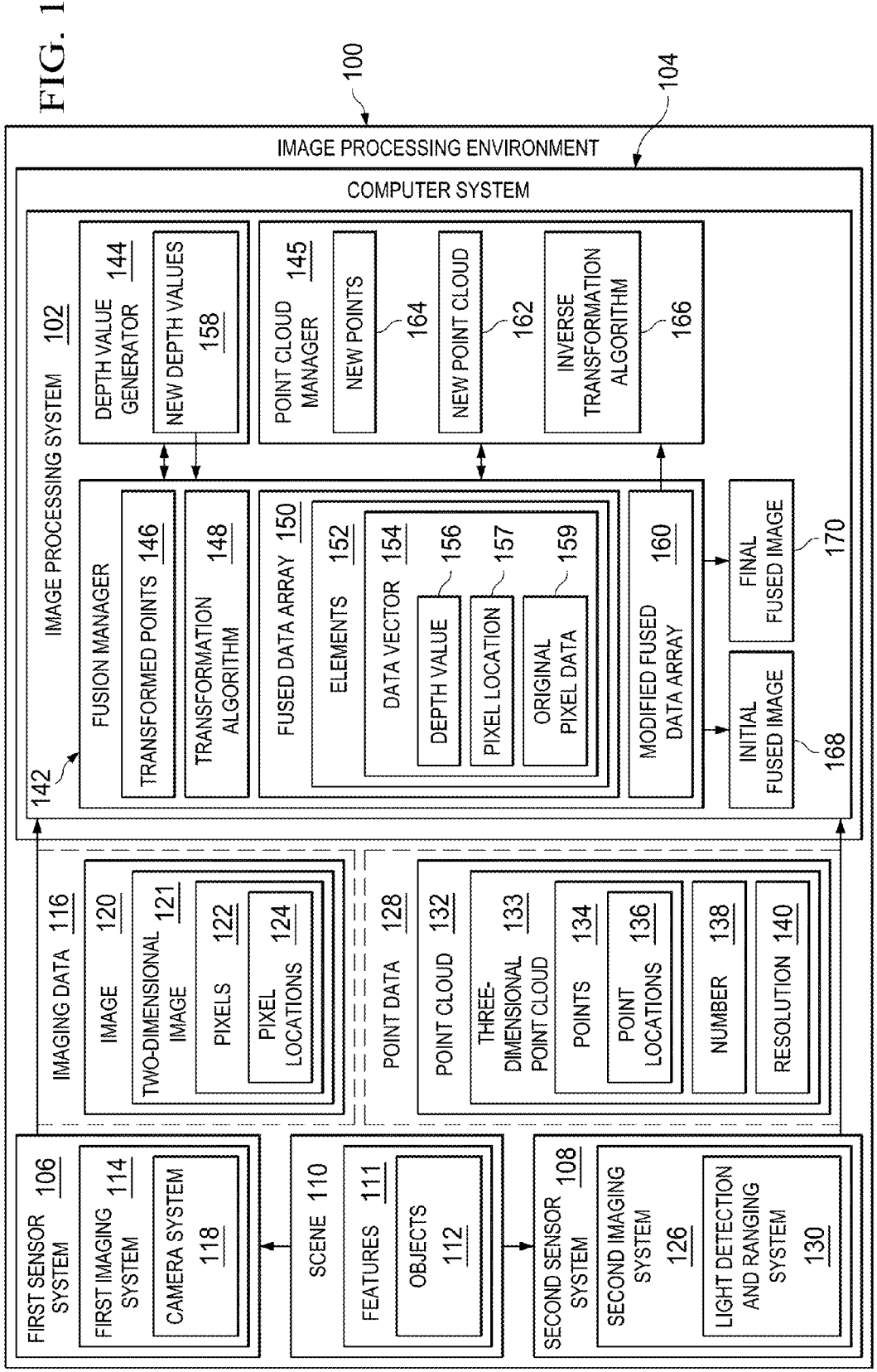
FIG. 1 is an example of an environment in which an image processing system may be used to process images and point clouds in the form of a block diagram in accordance with an illustrative embodiment.

With reference now to FIG. 1, an illustration of an image processing environment in the form of a block diagram is depicted in accordance with an illustrative embodiment. In FIG. 1, image processing environment 100 is an example of an environment in which image processing system 102 may be used to process images and point clouds.

As depicted, image processing system 102 may be implemented in computer system 104. Computer system 104 may be comprised of one or more computers and/or other types of hardware. When more than one computer is present in computer system 104, these computers may be in communication with one another.

Image processing system 102 may be configured to receive data from first sensor system 106 and second sensor system 108. First sensor system 106 and second sensor system 108 are configured to generate data about scene 110. Scene 110 may include features 111. Features 111 may include, for example, without limitation, objects 112. Objects 112 may include, for example, without limitation, any number of vehicles, buildings, manmade structures, people, animals, landscape features, and/or other types of objects. Further, features 111 may also include, for example, a background of scene 110.

In these illustrative examples, first sensor system 106 may take the form of first imaging system 114. First imaging system 114 may be any system configured to generate imaging data 116 for scene 110. In one illustrative example, first imaging system 114 takes the form of camera system 118. Further, camera system 118 may take the form of an electro-optical camera system.

Imaging data 116 may include, for example, without limitation, image 120. In particular, image 120 may be two-dimensional image 121. When generated by an electro-optical camera system, image 120 may be referred to as an electro-optical image.

As depicted, image 120 may be comprised of pixels 122. Pixels 122 may be arranged in a two-dimensional array comprised of rows and columns. In this illustrative example, pixel locations 124 may identify the locations of pixels 122 within this array. As one illustrative example, each of pixel locations 124 may identify a row and column for a corresponding pixel.

Additionally, each of pixels 122 may be associated with pixel data. The pixel data for a pixel may include, for example, without limitation, a number of color values, an intensity value, and/or other values. The number of color values may include, for example, a red value, a green value, and a blue value based on the RGB color model.

In these illustrative examples, second sensor system 108 may take the form of second imaging system 126. Second imaging system 126 may be any system configured to generate point data 128 for scene 110. In one illustrative example, second imaging system 126 takes the form of light detection and ranging system 130.

Point data 128 may include point cloud 132. Point cloud 132 may take the form of three-dimensional point cloud 133 in these illustrative examples. Point cloud 132 of scene 110 may be generated from a different perspective than image 120 of scene 110 in some illustrative examples.

Point cloud 132 is comprised of points 134 in a three-dimensional reference coordinate system. In these illustrative examples, each of point locations 136 may identify the coordinates for a corresponding point in this three-dimensional reference coordinate system. In one illustrative example, the reference coordinate system may be a real world coordinate system such as, for example, a geographical coordinate system.

Resolution 140 of point cloud 132 may be an identification of the level of detail with which features 111 in scene 110 captured by point cloud 132 may be discernible within point cloud 132. In some cases, resolution 140 of point cloud 132 may depend on number 138 of points 134 in point cloud 132. For example, as number 138 of points 134 in point cloud 132 increases, resolution 140 of point cloud 132 may also increase.

Image processing system 102 is configured to receive image 120 generated by camera system 118 and point cloud 132 generated by light detection and ranging system 130. Image processing system 102 uses image 120 to increase number 138 of point cloud 132, and thereby resolution 140 of point cloud 132. More specifically, image processing system 102 may be configured to generate new points that may be added to point cloud 132.

As depicted, image processing system 102 may include fusion manager 142, depth value generator 144, and point cloud manager 145. Fusion manager 142 is configured to map at least a portion of points 134 in point cloud 132 to image 120 to form transformed points 146. More specifically, fusion manager 142 is configured to map the point locations for at least a portion of points 134 in point cloud 132 to pixel locations in the image plane of image 120. The image plane of image 120 may be the plane that lies within the two-dimensional array of pixels 122.

Transformed points 146 may be formed using, for example, transformation algorithm 148. Transformation algorithm 148 may include any number of processes, equations, and/or algorithms for mapping at least a portion of points 134 to pixel locations in the image plane of image 120. In an illustrative example, transformation algorithm 148 may include a camera pose estimation algorithm such as, for example, an efficient perspective-n-point (EPnP) camera pose estimation algorithm.

The camera pose estimation algorithm may provide pose information for a pose of camera system 118. The pose of camera system 118 may be comprised of at least one of an orientation and position of camera system 118.

Fusion manager 142 uses transformation algorithm 148 to transform the three-dimensional reference coordinate system for point cloud 132 into a three-dimensional camera-centric coordinate system. In particular, fusion manager 142 may use the pose information for camera system 118 provided by the camera post estimation algorithm to transform the three-dimensional reference coordinate system into the three-dimensional camera-centric coordinate system.

With this transformation, the origin of the three-dimensional reference coordinate system may be moved to the location of camera system 118. Fusion manager 142 then identifies camera-centric coordinates for points 134 in the three-dimensional camera-centric coordinate system.

Thereafter, fusion manager 142 is configured to map the camera-centric coordinates for points 134 to corresponding pixel locations in the image plane of image 120 to form transformed points 146. In this manner, the camera-centric coordinates for a point in point cloud 132 may be mapped to a pixel location that lies inside image 120 or outside of image 120 but in the same image plane as image 120. Transformed points 146 may include only those points that are mapped to pixel locations within image 120.

Fusion manager 142 is configured to create fused data array 150 using image 120 and transformed points 146. Fused data array 150 includes data that has been fused together based on image 120 and point cloud 132.

As depicted, fused data array 150 may include elements 152. Each of elements 152 may correspond to one of pixels 122 in image 120, and each of pixels 122 may correspond to one of elements 152. In particular, elements 152 may have a one-to-one correspondence with pixels 122 in image 120. In this manner, fused data array 150 may have a same size as the array of pixels 122 in image 120.

Further, because each of transformed points 146 corresponds to a pixel in image 120, each of transformed points 146 may also correspond to the element in fused data array 150 that corresponds to that pixel. Each of transformed points 146 may be described as mapping to a corresponding one of elements 152.

For example, transformed points 146 may map to a first portion of elements 152. This first portion of elements may be referred to as matched elements. However, a second portion of elements 152 may not have any transformed points that map to these elements. The second portion of elements 152 may be referred to as unmatched elements.

In these illustrative examples, each of elements 152 may be associated with a data vector, such as, for example, data vector 154. As depicted, data vector 154 may include depth value 156. Depth value 156 may be a distance between the transformed point corresponding to the element associated with data vector 154 and camera system 118 within the three-dimensional camera-centric coordinate system.

When the element associated with data vector 154 is an unmatched element, depth value 156 may be a null or zero value. When the element associated with data vector 154 is a matched element, depth value 156 may be a non-null or non-zero value. Data vector 154 may be referred to as an unfilled data vector when depth value 156 is a null or zero value and a filled data vector when depth value 156 is a non-null or non-zero value. In this manner, unmatched elements in fused data array 150 may be associated with unfilled data vectors and matched elements in fused data array 150 may be associated with filled data vectors.

Additionally, depending on the implementation, data vector 154 may also include other data such as, for example, pixel location 157, original pixel data 159, and/or other types of data. Pixel location 157 may be the pixel location for the pixel corresponding to the element associated with data vector 154. Original pixel data 159 may be the pixel data in image 120 for the pixel corresponding to the element associated with data vector 154.

In these illustrative examples, depth value generator 144 is configured to generate new depth values 158 for at least a portion of the unfilled data vectors associated with unmatched elements in fused data array 150. In this manner, depth value generator 144 may identify new depth values 158 to replace at least a portion of the null depth values. The unfilled data vectors may then be filled, by fusion manager 142, with new depth values 158 to form modified fused data array 160.

New depth values 158 may be generated using modified fused data array 160. In particular, depth value generator 144 may use windows of selected sizes to scan and process fused data array 150. Further, estimation techniques, such as linear estimation techniques, may be used to generate new depth values 158. An example of one implementation for the process of generating new depth values 158 is described in FIGS. 2-6 below.

Point cloud manager 145 is configured to use modified fused data array 160 to create new point cloud 162. In particular, point cloud manager 145 may use the portion of elements in fused data array 150 having data vectors filled with new depth values 158 to identify new points 164 for point cloud 132.

As one illustrative example, point cloud manager 145 may map each of the pixel locations for the pixels corresponding to the portion of elements in fused data array 150 having data vectors filled with new depth values 158 to camera-centric coordinates in the three-dimensional camera-centric coordinate system. These camera-centric coordinates may then be transformed into the three-dimensional reference coordinate system for the original point cloud, point cloud 132, to form new points 164. This transformation may be performed using, for example, without limitation, inverse transformation algorithm 166. Inverse transformation algorithm 166 may be the inverse of transformation algorithm 148 used by fusion manager 142.

Point cloud manager 145 adds new points 164 to point cloud 132 to form new point cloud 162. This process of adding new points 164 to point cloud 132 may be referred to as "backfilling" point cloud 132. New point cloud 162 may have a greater number of points than number 138 of points 134 in point cloud 132. New points 164 may provide new point cloud 162 with an increased resolution as compare to resolution 140 of point cloud 132. New point 164 may capture features 111 in scene 110 with a desired level of accuracy.

Consequently, new point cloud 162 may be used in the place of point cloud 132 for performing any number of operations. For example, without limitation, new points 164 may enhance the visualization of scene 110 in new point cloud 162 as compared to point cloud 132. Further, new points 164 may allow one or more of objects 112 in scene 110 to be identified and/or classified using new point cloud 162 with a higher level of accuracy as compared to using point cloud 132.

For example, initial fused image 168 may be generated by fusion manager 142 using image 120 and point cloud 132. At least a portion of the points in point cloud 132 may be mapped to pixel locations in image 120 and overlaid on image 120 to create initial fused image 168. Final fused image 170 may be generated by fusion manager 142 using image 120 and new point cloud 162. At least a portion of the points in new point cloud 162 may be mapped to pixel locations in image 120 and overlaid on image 120 to create final fused image 170.

The visualization of scene 110 in final fused image 170 may be enhanced as compared to the visualization of scene 110 in initial fused image 168. In particular, the greater number of points in final fused image 170 as compared to initial fused image 168 may enhance the visualization of scene 110 in final fused image 170.

The illustration of image processing environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some illustrative examples, depth value generator 144 may be considered part of fusion manager 142. In other illustrative examples, fusion manager 142 and/or depth value generator 144 may be considered part of point cloud manager 145.

In other illustrative examples, some other module in image processing system 102 may be used to form initial fused image 168 and/or final fused image 170. In still other cases, some other data processing system or processor unit may be configured to process image 120 and new point cloud 162 to form final fused image 170.

Turning now to FIGS. 2-6, illustrations of a process for generating new depth values for unfilled data vectors associated with unmatched elements in a fused data array are depicted in accordance with an illustrative embodiment. The process illustrated in FIGS. 2-6 may be an example of one manner in which new depth values 158 in FIG. 1 may be generated. Further, this process may be performed using, for example, depth value generator 144 in FIG. 1.

Figure 2:
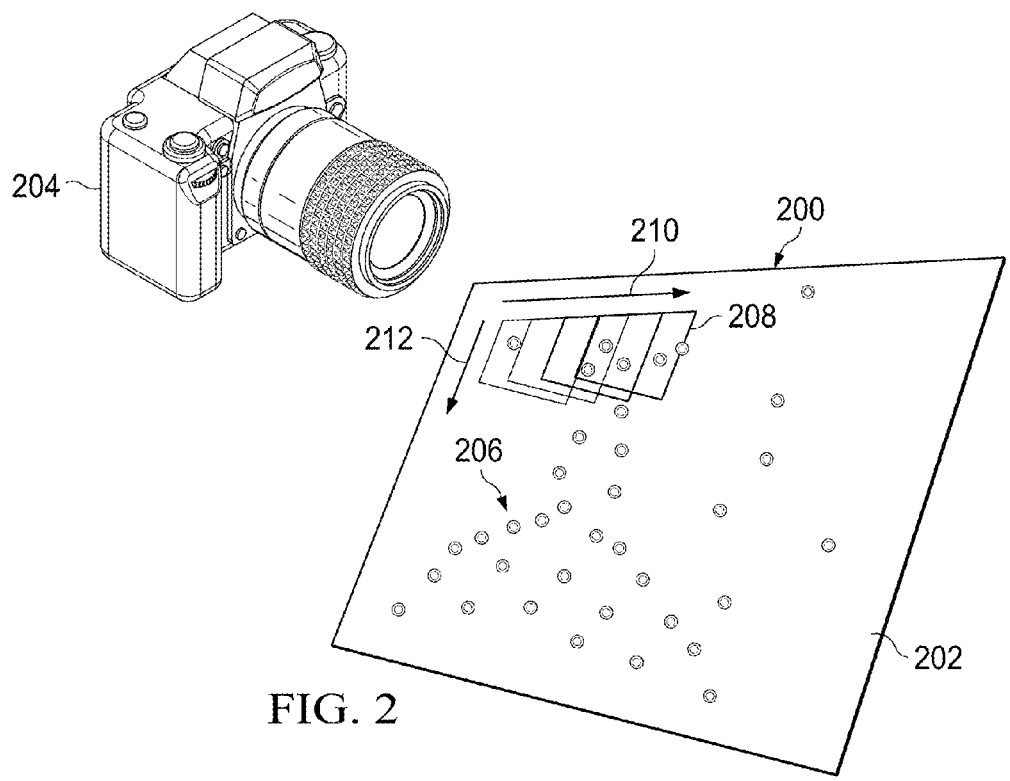
FIG. 2 is an illustration of a fused data array in accordance with an illustrative embodiment.

With reference now to FIG. 2, an illustration of a fused data array is depicted in accordance with an illustrative embodiment. In this illustrative example, fused data array 200 may be an example of one implementation for fused data array 150 in FIG. 1.

In FIG. 2, fused data array 200 may be the fusion of image 202 and transformed points 206. Image 202 may be an image generated by, for example, camera system 204. Transformed points 206 may include a portion of the points in a point cloud mapped to pixel locations in image 202, and thereby, elements in fused data array 200. Fused data array 200 may have been generated by, for example, fusion manager 142 in FIG. 1.

As depicted, depth value generator 144 may move window 208 along fused data array 200 in the direction of arrow 210 and arrow 212 to process fused data array 200. For example, window 208 may be moved to the location of every element within fused data array 200. In this illustrative example, window 208 may have one of a group of selected sizes. As used herein, a "group of" items may include one or more items. In this manner, a group of selected sizes may include one or more selected sizes.

Fused data array 200 may be fully scanned and processed using a window having each size in the group of selected sizes. Moving window 208 to the location of an element in fused data array 200 means centering window 208 at that element in this illustrative example. When the element at which window 208 is centered is an unmatched element, the portion of fused data array 200 overlapped by window 208 may be processed by depth value generator 144 to identify a new depth value for the unfilled data vector associated with this unmatched element.

Figure 3:
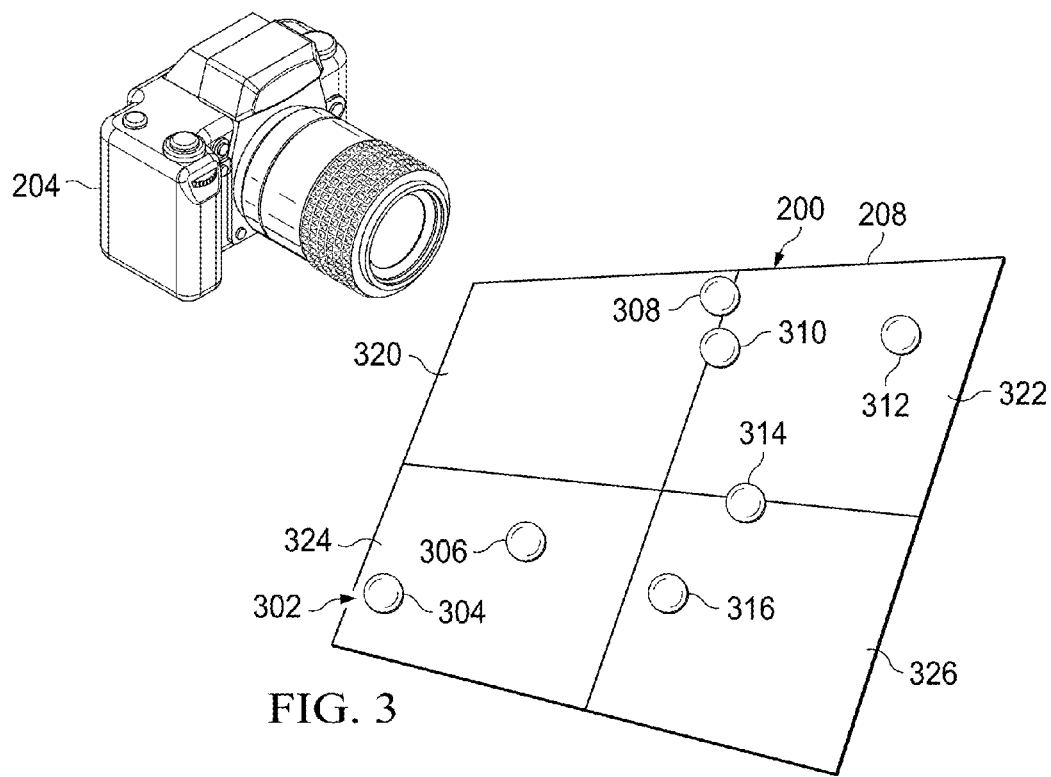
FIG. 3 is an illustration of a portion of a fused data array overlapped by a window in accordance with an illustrative embodiment.

With reference now to FIG. 3, an illustration of a portion of fused data array 200 overlapped by window 208 from FIG. 2 is depicted in accordance with an illustrative embodiment. In this illustrative example, portion 300 of fused data array 200 from FIG. 2 is overlapped by window 208.

In FIG. 3, group of matched elements 302 identify the elements in portion 300 of fused data array 200 to which a portion of transformed points 206 in FIG. 2 have been mapped. All other elements (not shown in this view) in portion 300 of fused data array 200 may be unmatched elements to which transformed points have not been mapped. As depicted, group of matched elements 302 includes matched elements 304, 306, 308, 310, 312, 314, and 316.

Depth value generator 144 first confirms that the depth value in the data vector associated with the element at which window 208 is centered is a null depth value. If the depth value is a non-null depth value, depth value generator 144 moves window 208 to another location. If the depth value is a null depth value, depth value generator 144 continues processing portion 300 of fused data array 200.

In this illustrative example, portion 300 of fused data array 200 is depicted divided into quadrants 320, 322, 324, and 326. Depth value generator 144 is configured to confirm that a sufficient number of matched elements are present in portion 300 of fused data array 200. Further, depth value generator 144 is configured to confirm that at least one matched element is present in each of quadrants 320, 322, 324, and 326.

Once depth value generator 144 confirms that a sufficient number of matched elements are present in portion 300 of fused data array 200 and that at least one matched element is present in each of quadrants 320, 322, 324, and 326, depth value generator 144 may continue processing portion 300 of fused data array 200. When a sufficient number of matched elements are not present in portion 300 or when one of quadrants 320, 322, 324, and 326 does not include a matched element, depth value generator 144 may move window 208 to a next location along fused data array 200.

Figure 4:
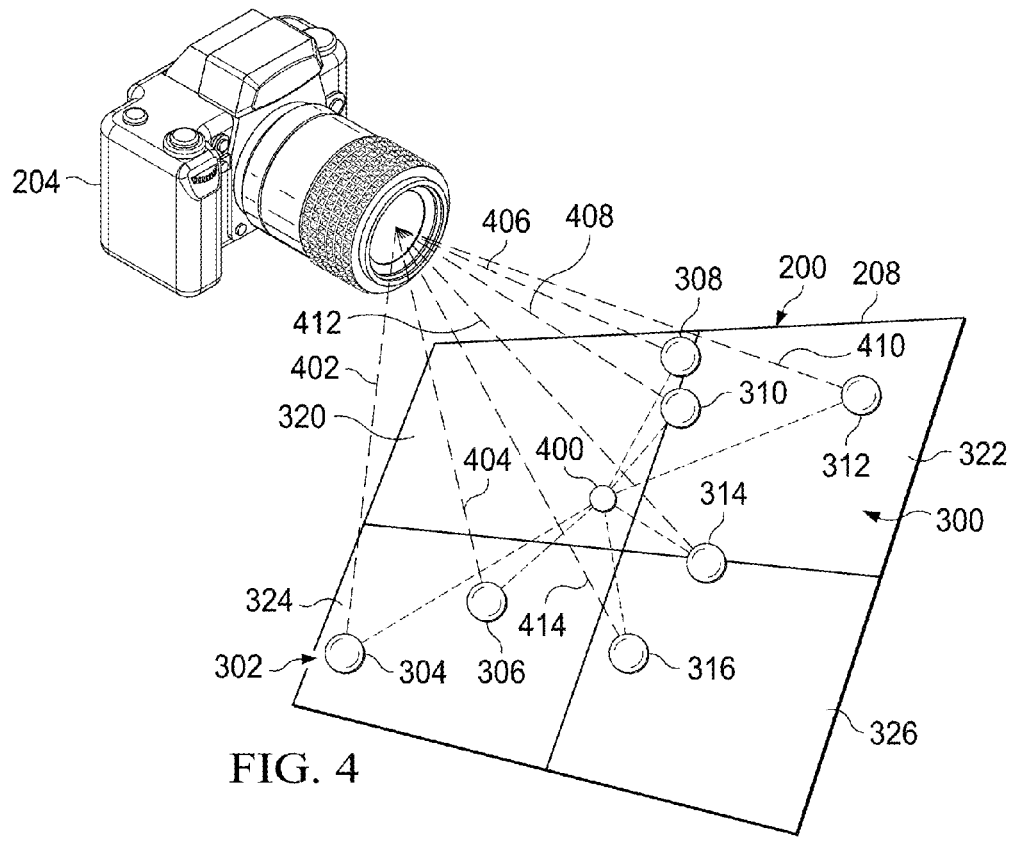
FIG. 4 is an illustration of a process for generating scores for each of a group of matched elements in accordance with an illustrative embodiment.

Turning now to FIG. 4, an illustration of a process for generating scores for each of group of matched elements 302 from FIG. 3 is depicted in accordance with an illustrative embodiment. In FIG. 4, depth value generator 144 is configured to generate a score for each matched element in group of matched elements 302. The score for a matched element may be based on the depth value in the filled data vector associated with the matched element and a similarity of the matched element to the other matched elements in group of matched elements 302.

The depth value in the filled data vector associated with the matched element may be the distance between camera system 204 and the location of the transformed point, which has been mapped to the matched element, within the three-dimensional camera-centric coordinate system. The depth values for group of matched elements 302 may be distances 402, 404, 406, 408, 410, 412, and 414 between matched elements 304, 306, 308, 310, 312, 314, and 316, respectively, and camera system 204.

The similarity of the matched element to the other matched elements in group of matched elements 302 may be based on any number of features. These features may include, for example, without limitation, pixel location, color, intensity, and/or other types of features or data within a data vector. In this illustrative example, the similarity of the matched element to the other matched elements may be based on the distance between the pixel location identified in the data vector associated with the matched element and ideal pixel location 400. The pixel location may be the same as the location for the matched element within fused data array 200.

Figure 5:
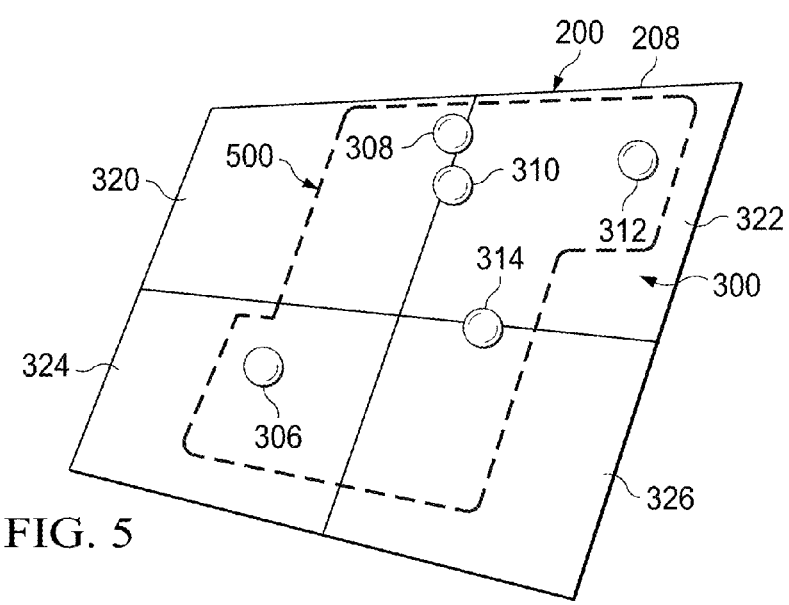
FIG. 5 is an illustration of a selection of support elements in accordance with an illustrative embodiment.

With reference now to FIG. 5, an illustration of a selection of support elements is depicted in accordance with an illustrative embodiment. In this illustrative example, the scores generated for group of matched elements 302, as described in FIG. 4, may be sorted, or ordered.

The desired number of support elements may be five support elements in this illustrative example. The five matched elements having the five lowest scores are selected as support elements 500. Support elements 500 include matched elements 306, 308, 310, 312, and 314.

In this illustrative example, support elements 500 may be selected such that the number of new points created for actual holes and/or gaps in the scene captured by image 202 is reduced. Further, support elements 500 may be selected such that the new points created actually represent an external surface of an object.

Figure 6:
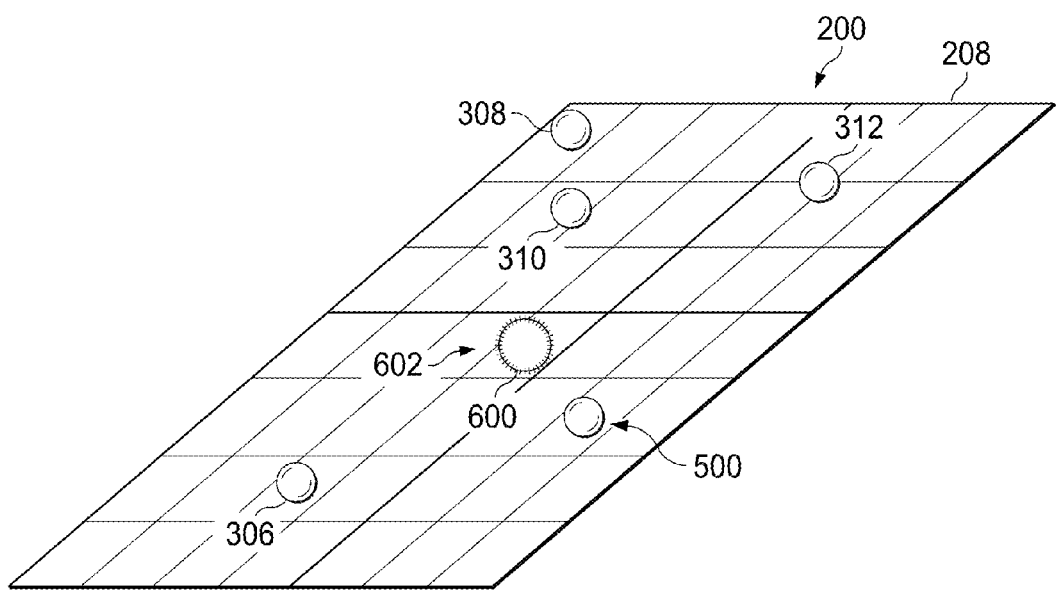
FIG. 6 is an illustration of the generation of a new depth value in accordance with an illustrative embodiment.

Turning now to FIG. 6, an illustration of the generation of a new depth value is depicted in accordance with an illustrative embodiment. In this illustrative example, support elements 500 from FIG. 5 may be used to generate a new depth value for element 600 at which window 208 was centered. Element 600 is at location 602 in fused data array 200, which may be the center location of portion 300 of fused data array 200.

The new depth value for element 600 may be generated using, for example, linear estimation. In particular, a linear estimation algorithm may use the depth value in the filled data vector associated with each of support elements 500 to estimate the new depth value for element 600. This new depth value may be used to fill the data vector associated with element 600.

The process described in FIGS. 3-6 may be repeated for each location in fused data array 200 to which window 208 from FIG. 2 is moved. Further, the entire process described in FIGS. 2-6 may be repeated using windows of different selected sizes.

In this manner, the entire fused data array 200 may be scanned and processed with a window having each of a group of selected sizes. Still further, this entire process of using the windows having the group of selected sizes may be iterated any number of times to fill at least a portion of the unfilled data vectors associated with the unmatched elements in fused data array 200.

The illustrations in FIGS. 2-6 are not meant to imply physical or architectural limitations to the manner in which an illustrative embodiment may be implemented. These illustrations are presented to describe the concept of generating new depth values in an abstract manner.

Figure 7:
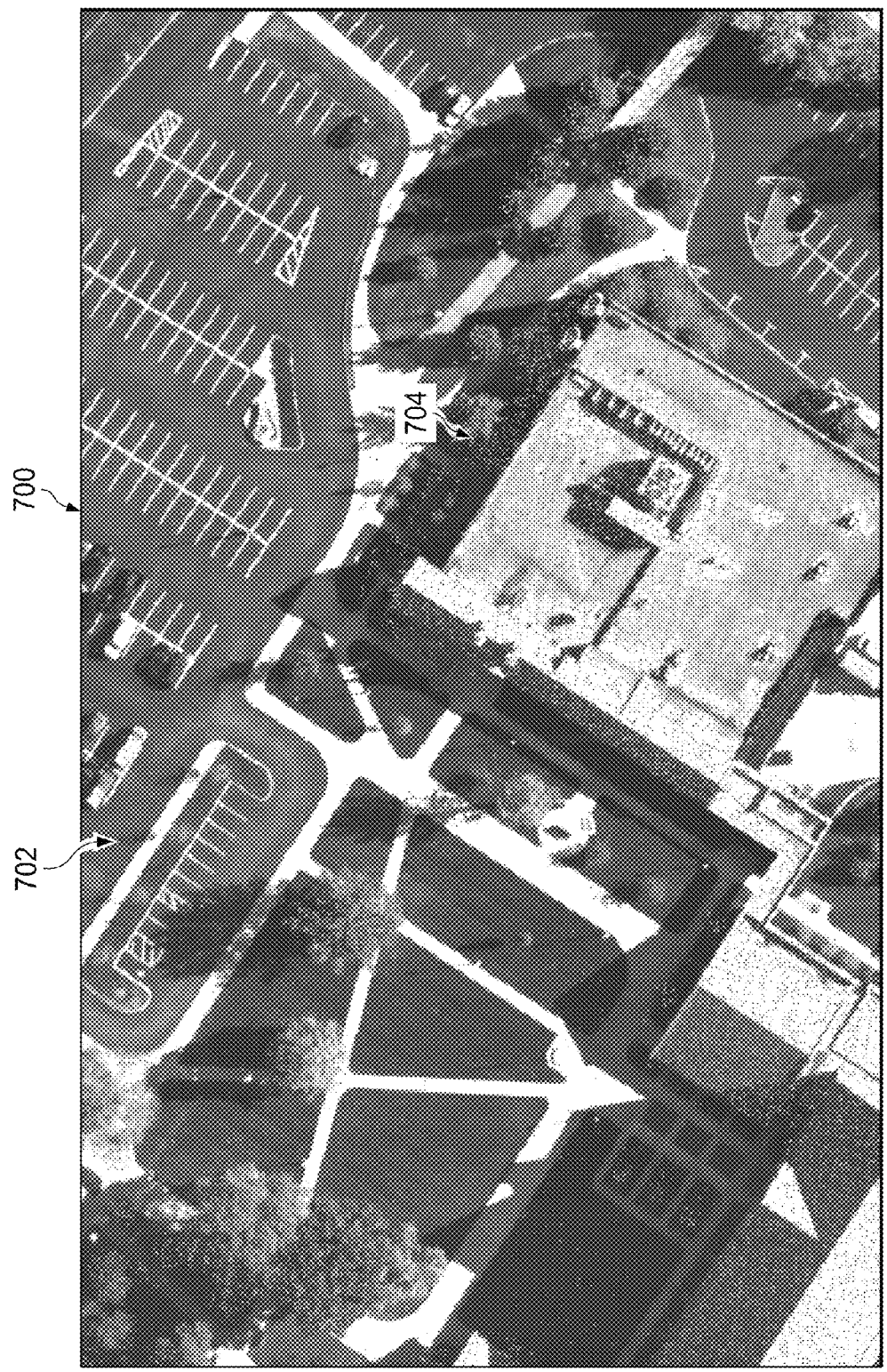
FIG. 7 is an illustration of a fused image in accordance with an illustrative embodiment.

With reference now to FIG. 7, an illustration of a fused image is depicted in accordance with an illustrative embodiment. Fused image 700 may be an example of one implementation for fused data array 150 in FIG. 1. Fused image 700 may be a combination of image 702 and transformed points 704. In this illustrative example, each pixel in fused image 700 may be associated with a data vector, such as data vector 154 in FIG. 1.

Figure 8:
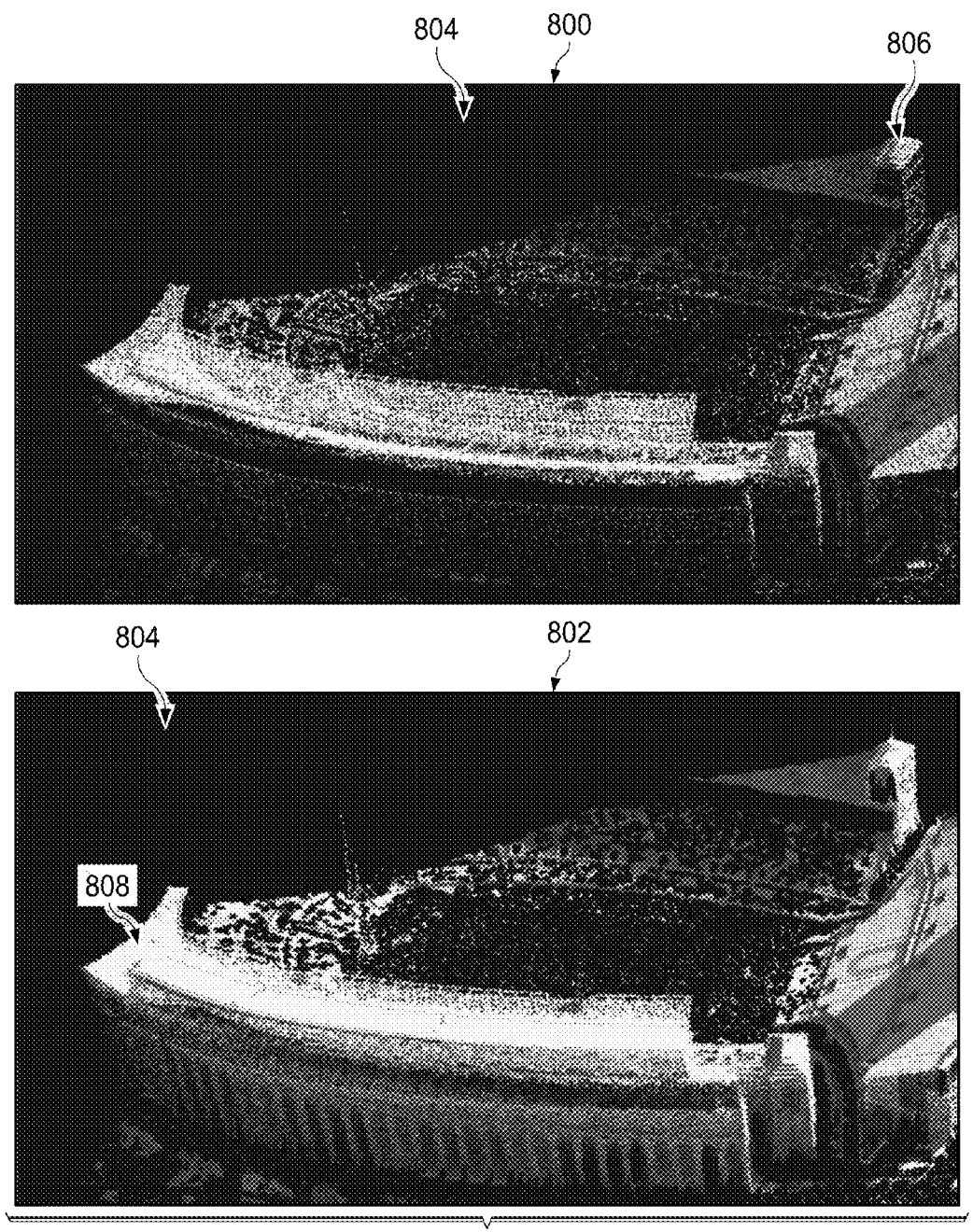
FIG. 8 is an illustration of a comparison between two fused images in accordance with an illustrative embodiment.

Turning now to FIG. 8, an illustration of a comparison between two fused images is depicted in accordance with an illustrative embodiment. In this illustrative example, initial fused image 800 is an example of one implementation for initial fused image 168 in FIG. 1. Further, final fused image 802 is an example of one implementation for final fused image 170 in FIG. 1.

As depicted, initial fused image 800 is a fusion of image 804 and transformed points 806. Transformed points 806 may include points mapped from an original point cloud, such as, for example, point cloud 132 in FIG. 1. Final fused image 802 is a fusion of the same image 804 and transformed points 808. Transformed points 808 may include points mapped from a new point cloud, such as, for example, new point cloud 162 in FIG. 1. The scene captured in image 804 may be better realized by transformed points 808 in final fused image 802 as compared to transformed points 806 in initial fused image 800.

Figure 9:
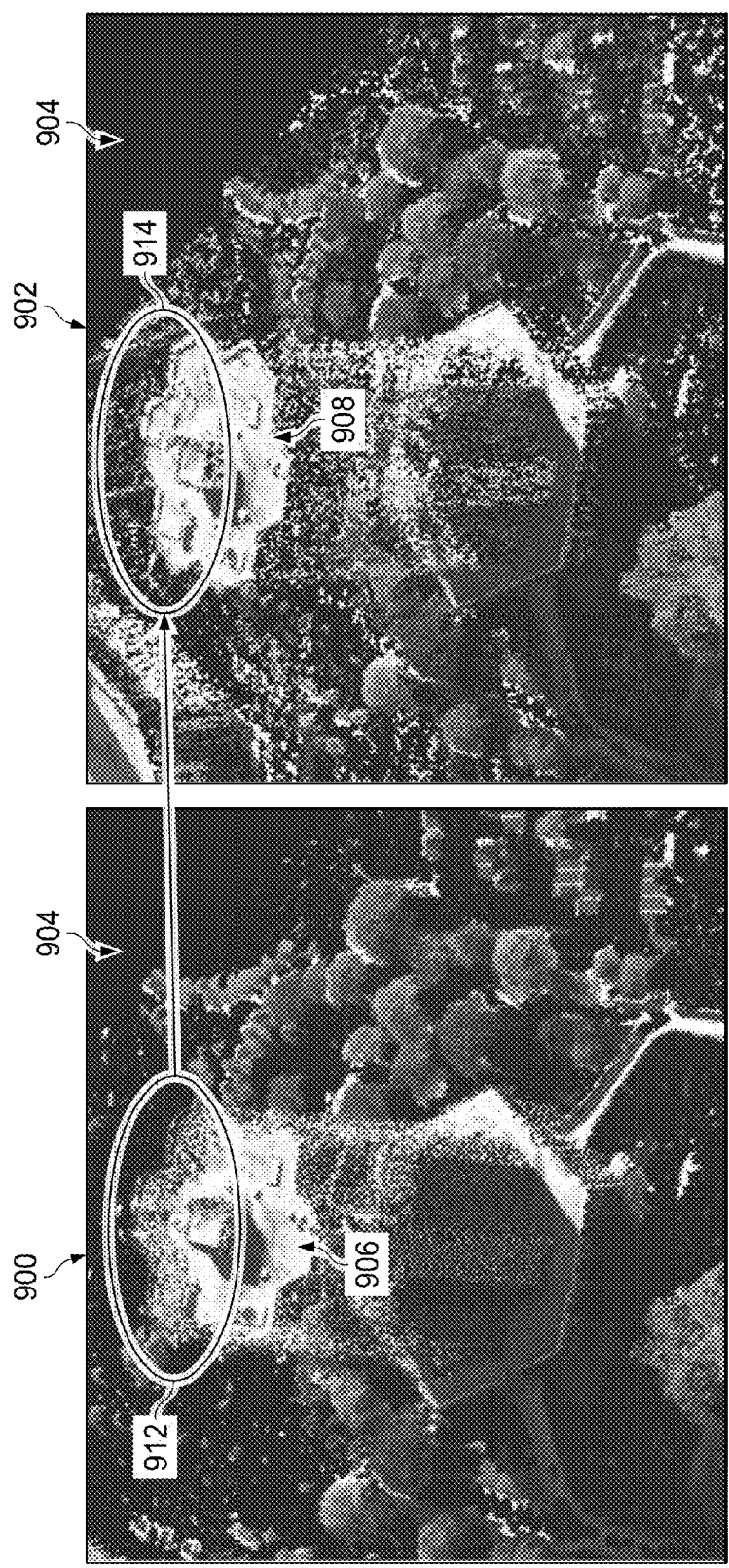
FIG. 9 is an illustration of a comparison of a final fused image in accordance with an illustrative embodiment.

With reference now to FIG. 9, an illustration of a comparison of a final fused image generated when support elements are used and a final fused image generated when support elements are not used is depicted in accordance with an illustrative embodiment. In this illustrative example, a comparison of final fused image 900 and final fused image 902 is depicted. These final fused images are examples of implementations for final fused image 170 in FIG. 1.

Final fused image 900 is a fusion of image 904 and transformed points 906. Final fused image 902 is a fusion of the same image 904 and transformed points 908. Transformed points 906 and transformed points 908 may both include points mapped from a corresponding new point cloud to which new points have been added.

However, transformed points 906 may include points from a new point cloud generated without the use of support elements. Transformed points 908 may include points from a new point cloud generated with the use of support elements. As depicted, the surface and shape of the top of the building depicted in portion 912 of final fused image 900 may be less clearly defined and less accurate than the surface and shape of top of the building depicted in portion 914 of final fused image 902.

Figure 10:
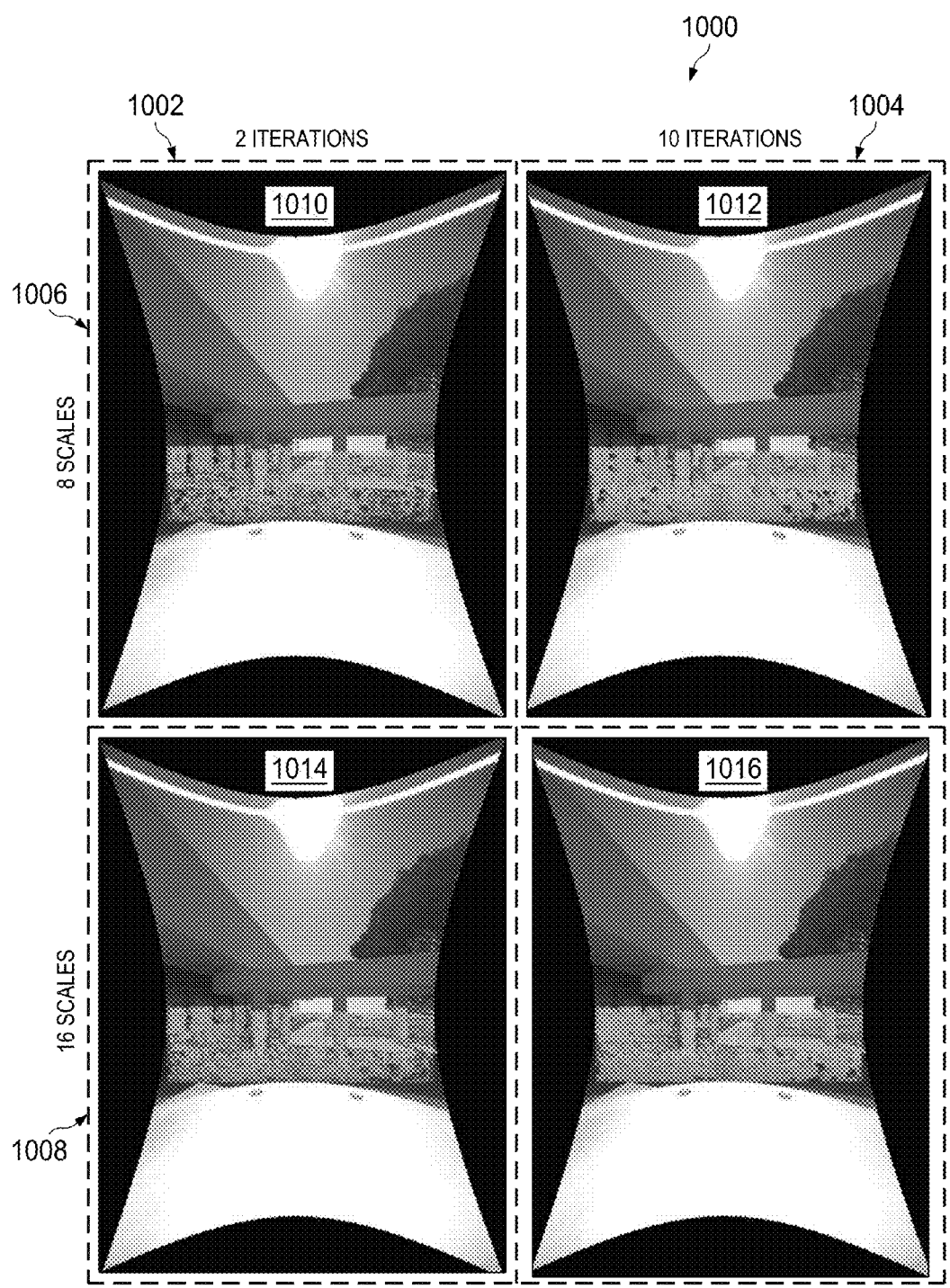
FIG. 10 is an illustration of a table of final fused images in accordance with an illustrative embodiment.

With reference now to FIG. 10, an illustration of a table of final fused images is depicted in accordance with an illustrative embodiment. In FIG. 10, table 1000 includes column 1002, column 1004, row 1006, and row 1008.

Column 1002 includes final fused image 1010 and final fused image 1014 generated using two iterations of scanning windows having a group of selected sizes across a fused data array. Column 1004 includes final fused image 1012 and final fused image 1016 generated using ten iterations of scanning windows having a group of selected sizes across a fused data array.

Row 1006 includes final fused image 1010 and final fused image 1012 generated using eight sizes of windows per iteration. Further, row 1008 includes final fused image 1014 and final fused image 1016 generated using sixteen sizes of windows per iteration.

As depicted, the number of points included in a final fused image increases as the number of iterations and the number of sizes for the windows per iteration increase. As the number of points in a final fused image increases, visualization of the scene within the final fused image may be enhanced.

The illustrations of fused images in FIGS. 7-10 are not meant to imply physical or architectural limitations to the manner in which an illustrative embodiment may be implemented. These fused images are examples of how fused images, such as initial fused image 168 and final fused image 170 from FIG. 1, may be implemented.

Figure 11:
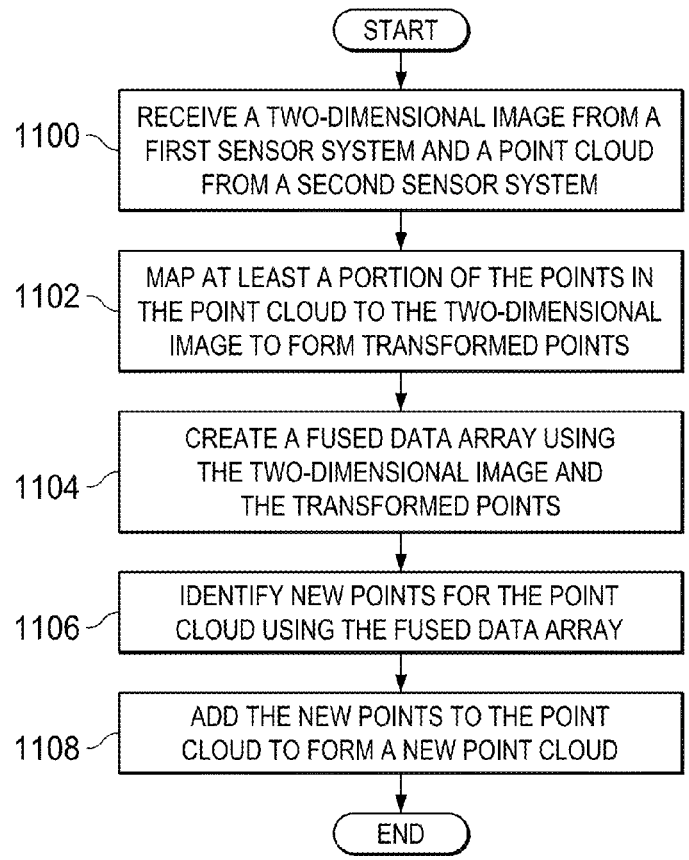
FIG. 11 is an illustration of a process for increasing a number of points in a point cloud in the form of a flowchart in accordance with an illustrative embodiment.

With reference now to FIG. 11, an illustration of a process for increasing a number of points in a point cloud in the form of a flowchart is depicted in accordance with an illustrative embodiment. The process illustrated in FIG. 11 may be implemented using image processing system 102 in FIG. 1.

The process begins by receiving a two-dimensional image from a first sensor system and a point cloud from a second sensor system (operation 1100). In operation 1100, the two-dimensional image may be received from a first sensor system in the form of a camera system, such as camera system 118 in FIG. 1. In this illustrative example, the two-dimensional image may be a color image. Further, the point cloud may be received from a second sensor system in the form of a light detection and ranging system, such as light detection and ranging system 130 in FIG. 1.

Both the two-dimensional image and the point cloud may be of the same scene. However, depending on the implementation, the two-dimensional image and the point cloud may capture the same scene from the same or different perspectives.

Next, at least a portion of the points in the point cloud may be mapped to the two-dimensional image to form transformed points (operation 1102). Next, a fused data array is created using the two-dimensional image and the transformed points (operation 1104).

Thereafter, new points for the point cloud are identified using the fused data array (operation 1106). The new points are added to the point cloud to form a new point cloud (operation 1108), with the process terminating thereafter. The increased number of points in the new point cloud as compared to the original point cloud may provide the new point cloud with an increased resolution as compared to the original point cloud.

In other words, the new point cloud may capture features in the scene more accurately than the original point cloud. The new point cloud may be used to perform a number of different operations such as, for example, without limitation, object identification, object classification, segmentation, scene visualization, and/or other types of operations.

Figure 12:
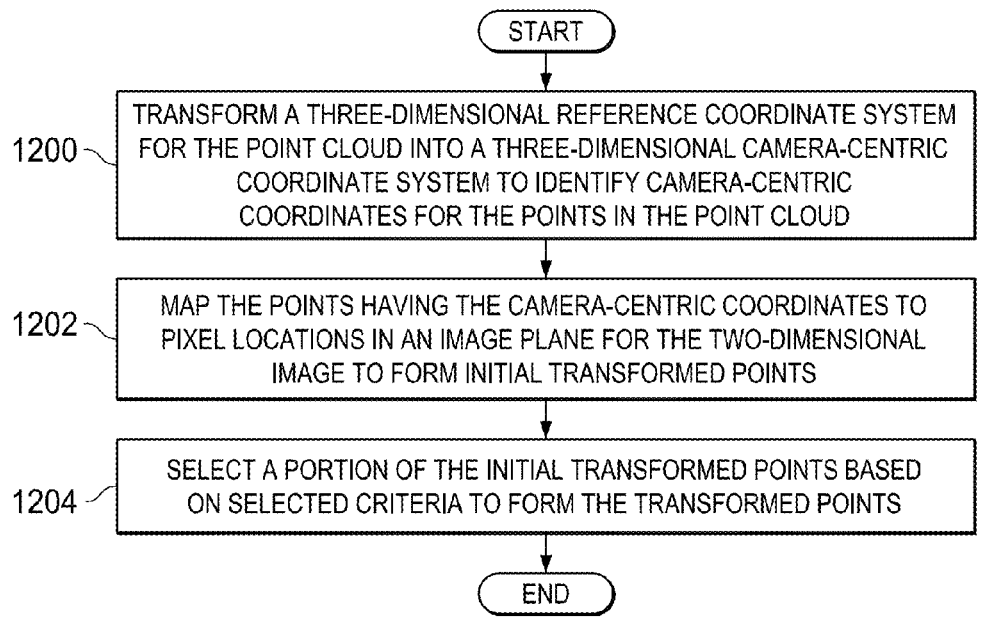
FIG. 12 is an illustration of a process for mapping points in a point cloud to a two-dimensional image to form transformed points in the form of a flowchart in accordance with an illustrative embodiment.

With reference now to FIG. 12, an illustration of a process for mapping points in a point cloud to a two-dimensional image to form transformed points in the form of a flowchart is depicted in accordance with an illustrative embodiment. The process illustrated in FIG. 12 may be used to implement operation 1102 in FIG. 11. Further, this process may be performed using fusion manager 142 in image processing system 102 in FIG. 1.

The process begins by transforming the three-dimensional reference coordinate system for the point cloud into a three-dimensional camera-centric coordinate system to identify camera-centric coordinates for the points in the point cloud (operation 1200). The three-dimensional reference coordinate system may be, for example, a geographical coordinate system or some other type of real world coordinate system. The origin of the three-dimensional camera-centric coordinate system is the location of the camera system that generated the two-dimensional image.

For example, for each point at a given location, $X^p$, $Y^p$, $Z^p$, in the three-dimensional reference coordinate system, the camera-centric coordinates are identified as follows:

$$\begin{bmatrix} X^c \\ Y^c \\ Z^c \\ 1 \end{bmatrix} = \begin{bmatrix} R_{11} & R_{12} & R_{13} & T_x \\ R_{21} & R_{22} & R_{23} & T_y \\ R_{31} & R_{32} & R_{33} & T_z \\ 0 & 0 & 0 & 1 \end{bmatrix} \begin{bmatrix} X^p \\ Y^p \\ Z^p \\ 1 \end{bmatrix}$$

where $X^p$, $Y^p$, $Z^p$ are the coordinates for the point in the three-dimensional reference coordinate system; $X^C$, $Y^C$, $Z^C$ are the camera-centric coordinates for the point in the three-dimensional camera-centric coordinate system; R is a rotation; and T is a translation.

The rotation, R, and the translation, T, may be identified using a transformation algorithm that includes a camera pose estimation algorithm, such as an efficient perspective-n-point camera pose estimation algorithm. This efficient perspective-n-point camera pose estimation algorithm identifies pose information for a pose of the camera system that generated the two-dimensional image. The pose of the camera system may be comprised of at least one of an orientation and position of the camera system. The transformation algorithm uses the pose information of the camera system to generate the camera-centric coordinates for the point.

Next, the points having the camera-centric coordinates are mapped to pixel locations in an image plane for the two-dimensional image to form initial transformed points (operation 1202). Each of the initial transformed points may be a point corresponding to a pixel at a particular pixel location within the image plane of the two-dimensional image. For example, each point may be mapped to a pixel location, u, v, as follows:

$$u = X^c/Z^c$$

$$v = Y^c/Z^c$$

where u is the row for the pixel location and v is the column for the pixel location.

Thereafter, a portion of the initial transformed points are selected based on selected criteria to form the transformed points (operation 1204), with the process terminating thereafter. In operation 1204, the portion of the initial transformed points selected may include points having a row, u, that is greater than zero and less than or equal to the maximum number of rows in the two-dimensional image and having a column, v, that is greater than zero and less than or equal to the maximum number of columns in the two-dimensional image. In this manner, the transformed points may only include pixel locations that are inside the two-dimensional image and not outside of the two-dimensional image.

Figure 13:
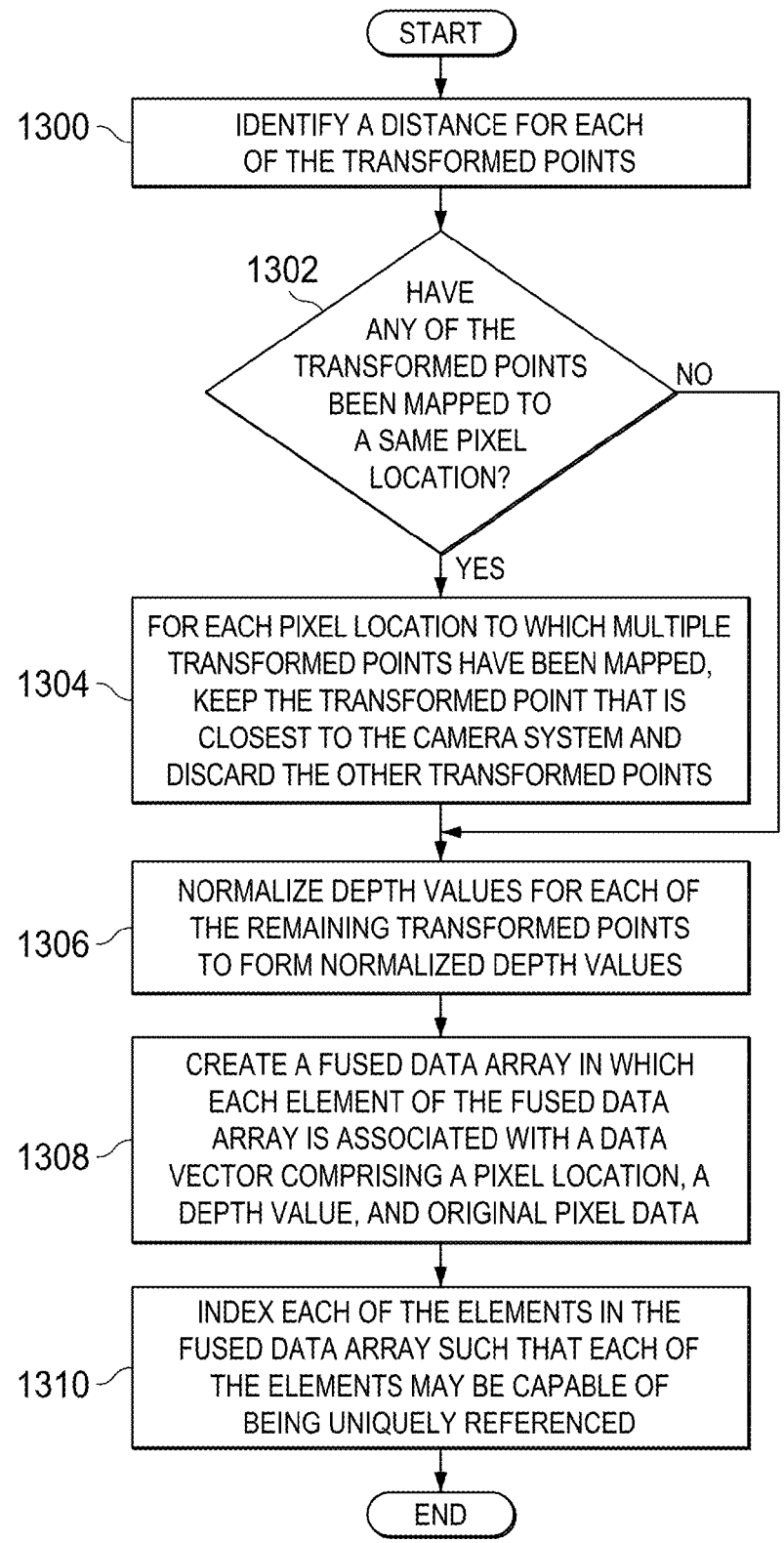
FIG. 13 is an illustration of a process for creating a fused data array in the form of a flowchart in accordance with an illustrative embodiment.

With reference now to FIG. 13, an illustration of a process for creating a fused data array in the form of a flowchart is depicted in accordance with an illustrative embodiment. The process illustrated in FIG. 13 may be used to implement operation 1104 in FIG. 11.

The process begins by identifying a distance for each of the transformed points (operation 1300). This distance may be the distance between the camera-centric coordinates for the transformed point and the camera system. The distance may be identified as follows:

$$d^c = \sqrt{(X^c)^2 + (Y^c)^2 + (Z^c)^2}$$

where $d^c$ is the distance.

Thereafter, a determination is made as to whether any of the transformed points have been mapped to a same pixel location (operation 1302). If any of the transformed points have been mapped to the same pixel location, then for each pixel location to which multiple transformed points have been mapped, the transformed point that is closest to the camera system is kept and the other transformed points are discarded (operation 1304).

Next, the process normalizes the depth values for each of the remaining transformed points to form normalized depth values (operation 1306). For example, for each remaining transformed point, i, the normalized distance is identified as follows:

$$d_i^o = \frac{d_i^c - d_{min}^c}{d_{min}^c - d_{max}^c}$$

where $d_i^o$ is the normalized distance for the transformed point; $d_i^c$ is the distance identified for the transformed point in operation 1300; $d_{min}^c$ is a predetermined minimum distance; and $d_{max}^c$ is a predetermined maximum distance. The predetermined minimum distance and the predetermined maximum distance may be computed automatically using, for example, a computer system.

Thereafter, the fused data array is created in which each element of the fused data array is associated with a data vector comprising a pixel location, a depth value, and original pixel data (operation 1308). The elements in the fused data array may have a one-to-one correspondence with the pixels in the two-dimensional image. The pixel location in the data vector associated with an element in the fused data array may include the row and column for the pixel corresponding to the element. The depth value in the data vector associated with the element may be the normalized distance identified for the transformed point that has been mapped to the pixel corresponding to the element. If no transformed point has been mapped to the pixel corresponding to the element, the depth value may be null. The original pixel data in the data vector associated with the element may include, for example, the red value, the green value, and the blue value for the pixel corresponding to the element.

In this manner, the data vector associated with an element in the fused data array may be represented as follows:

$$q_i = \{u_i, v_i, d_i^o, r_i, g_i, b_i\}$$

where $q_i$ is the data vector associated with the $i^{th}$ element in the fused data array; $u_i$ is the row for the pixel corresponding to the $i^{th}$ element; $v_i$ is the column for the pixel corresponding to the $i^{th}$ element; $d_i^o$ is the depth value for a transformed point mapped to the pixel corresponding to the $i^{th}$ element; and $r_i$, $g_i$, $b_i$ are the red value, the green value, and the blue value for the pixel corresponding to the $i^{th}$ element. When a transformed point has not been mapped to the pixel corresponding to the element in the fused data array, the data vector associated with the element may be represented as follows:

$$q_i = \{u_i, v_i, 0, r_i, g_i, b_i\}$$

Next, each of the elements in the fused data array may be indexed such that each of the elements may be capable of being uniquely referenced (operation 1310), with the process terminating thereafter. For example, each element may be indexed as follows:

$$l = u_i + v_i \cdot C_I$$

where l is the index for the element and $C_I$ is the number of columns in the two-dimensional image.

The elements in the fused data array corresponding to pixels to which transformed points have been mapped are matched elements. The elements in the fused data array corresponding to pixels to which no transformed points have been mapped are unmatched elements.

With reference again to operation 1302, if none of the transformed points have been mapped to same pixel location, the process proceeds to operation 1306 as described above. In this manner, the process described in FIG. 13 may be used to create a fused data array, such as fused data array 150 in FIG. 1.

Figure 14:
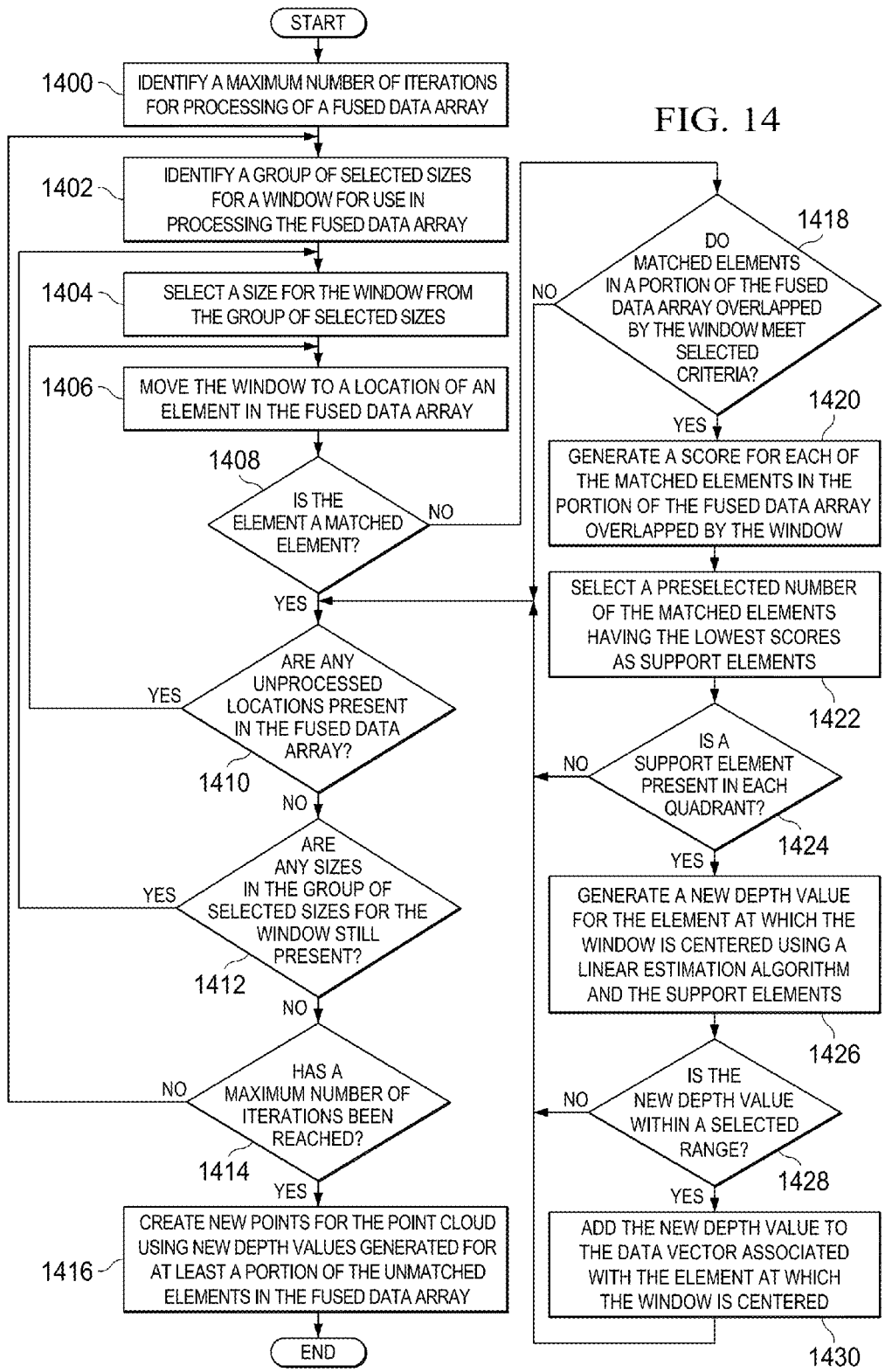
FIG. 14 is an illustration of a process for generating new depth values in the form of a flowchart in accordance with an illustrative embodiment.

With reference now to FIG. 14, an illustration of a process for generating new depth values in the form of a flowchart is depicted in accordance with an illustrative embodiment. The process illustrated in FIG. 14 may be used to implement operation 1106 in FIG. 11.

The process begins by identifying a maximum number of iterations for processing of a fused data array (operation 1400). Next, a group of selected sizes for a window is identified for use in processing the fused data array (operation 1402). Thereafter, a size for the window is selected from the group of selected sizes (operation 1404). Each of the sizes in group of selected sizes may be an n by n size. In this manner, each window may have a length and width that are equal. In this illustrative example, each n may be an odd number.

The window is moved to the location of an element in the fused data array (operation 1406). A determination is made as to whether the element is a matched element or an unmatched element (operation 1408). A matched element has a data vector with a non-null depth value. An unmatched element has a data vector with a null depth value. If the element is a matched element, a determination is made as to whether any unprocessed locations are present in the fused data array (operation 1410).

If any unprocessed locations are present in the fused data array, the process returns to operation 1406 as described above. Otherwise, a determination is made as to whether any sizes in the group of selected sizes for the window are still present (operation 1412). If any sizes in the group of selected sizes for the window are still present, the process returns to operation 1404 as described above. Otherwise, one iteration is now considered as being completed and a determination is made as to whether the maximum number of iterations has been reached (operation 1414). If the maximum number of iterations has not been reached, the process returns to operation 1402 as described above. Otherwise, the process creates new points for a point cloud using new depth values generated for at least a portion of the unmatched elements in the fused data array (operation 1416), with the process terminating thereafter.

With reference again to operation 1408, if the element is an unmatched element, a determination is made as to whether the matched elements in the portion of a fused data array overlapped by the window meets selected criteria (operation 1418). The matched elements in the portion of the fused data array overlapped by the window meet the selected criteria if the number of matched elements is greater than a selected threshold and if at least one matched element is present in each quadrant of the portion of the fused data array overlapped by the window.

If the matched elements do not meet the selected criteria, the process proceeds to operation 1410 as described above. Otherwise, a score is generated for each of the matched elements in the portion of the fused data array overlapped by the window (operation 1420). For example, the score may be a goodness score for the matched element. The goodness score may be based on a combination of the distance of the transformed point mapped to the pixel corresponding to the element from the camera system and a dissimilarity of the matched element to the other matched elements.

With n matched elements in the portion of the fused data array overlapped by the window, the goodness score may be generated as follows:

$$G_i = \sqrt{M_i^2 + \Delta_i^2},$$

where $$M_i = \frac{\sum_{j=1}^{n} \sqrt{(F_{1,i} - F_{1,j})^2 + \ldots + (F_{m,i} - F_{m,j})^2}}{n},$$

where $$\Delta_i = d_i^o \cdot \gamma,$$

and where $G_i$ is the goodness score of the $i^{th}$ matched element; $M_i$ is a dissimilarity score for the $i^{th}$ matched element; $\Delta_i$ is a distance measurement for the $i^{th}$ matched element; j is an index for the n matched elements; F is a response to a feature; m is the number of features; $d_i^o$ is the depth value in the data vector associated with the $i^{th}$ matched element; and γ is a normalizing constant. If both feature responses and depth values are normalized between 0 to 1, the normalizing constant, γ, may be set to $\sqrt{m}$.

In this illustrative example, a feature may be, for example, pixel location, intensity, color, or some other type of feature. The response to that feature may be a value for that feature.

Next, the matched elements having a preselected number of the lowest scores are selected as support elements (operation 1422). For example, a number may be preselected for the desired number of support elements. This preselected number may be four, five, eight, ten, or some other number. In operation 1422, the scores generated in operation 1420 may be sorted. If the preselected number is five, the matched elements having the five lowest scores are selected as the support elements.

A determination is then made as to whether a support element is present in each quadrant (operation 1424). If a support element is not present in each quadrant, the process proceeds to operation 1410 as described above. Otherwise, a new depth value is generated for the element at which the window is centered using a linear estimation algorithm and the support elements (operation 1426).

In operation 1426, the new depth value may be identified using a linear system such as, for example:

$$\widehat{d_l^o} = \omega_0 + u_l \cdot \omega_1 + v_l \cdot \omega_2$$

where $\widehat{d_l^o}$ is the new depth value and $\omega_0$, $\omega_1$, and $\omega_2$ are weights. Of course, any type of polynomial approximation algorithm may be used to solve for the new depth value using the depth values for the support elements.

Thereafter, a determination is made as to whether the new depth value is within a selected range (operation 1428). The new depth value may be within the selected range if $\widehat{d_l^o} < \delta_l$, where $$\delta_l = d_{min}^o \cdot \left(1 + \frac{W^x}{2} \cdot \alpha\right),$$

and
where $d_{min}^o$ is smallest distance of a transformed point mapped to a pixel corresponding to a support element from the camera system; $W^x$ is a width of the window; and α is a constant perspective adjustment weight.

If the new depth value is not within the selected range, the process proceeds to operation 1410 as described above. In this manner, the new depth value is not added to the data vector corresponding to the element at which the window is centered. Rather, the depth value in this data vector remains null. However, if the new depth value is within the selected range, the new depth value is added to the data vector associated with the element at which the window is centered (operation 1430). The process then proceeds to operation 1410 as described above.

Figure 15:
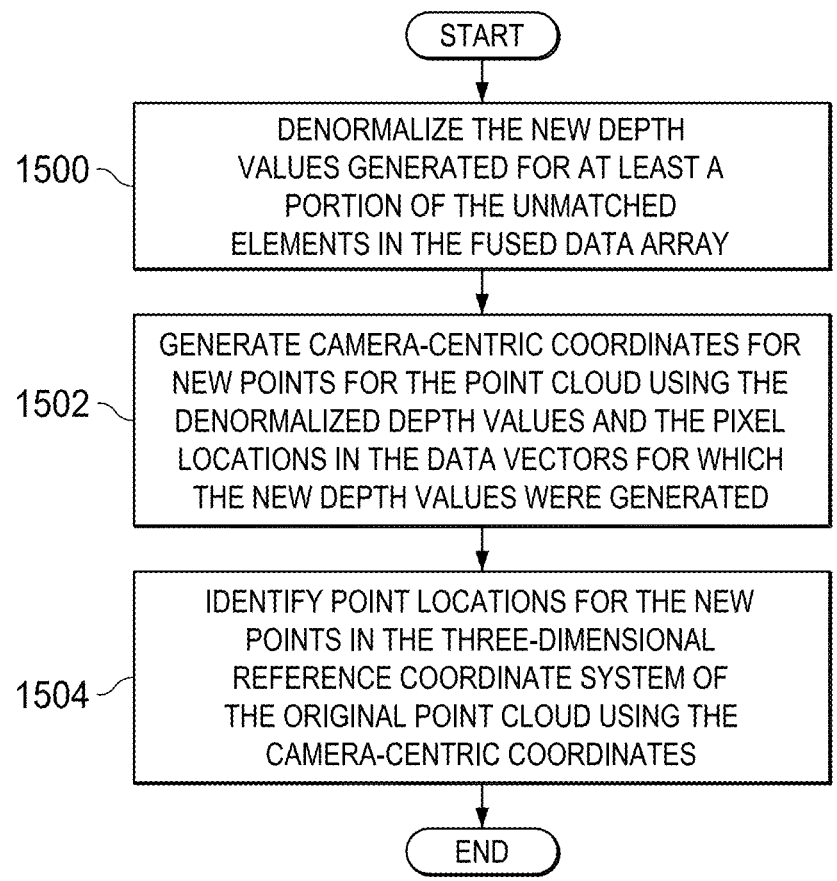
FIG. 15 is an illustration of a process for generating new points for a point cloud in the form of a flowchart in accordance with an illustrative embodiment.

With reference now to FIG. 15, an illustration of a process for generating new points for a point cloud in the form of a flowchart is depicted in accordance with an illustrative example. The process illustrated in FIG. 15 may be used to implement operation 1416 in FIG. 14.

The process begins by denormalizing the new depth values generated for at least a portion of the unmatched elements in the fused data array (operation 1500). Each of these new depth values is used to create a new point for the point cloud. The new depth values may be denormalized as follows:

$$d_i^c = d_{min}^c + d_i^o \cdot (d_{max}^c - d_{min}^c)$$

where $d_i^c$ is a denormalized depth value.

Camera-centric coordinates are generated for the new points for the point clouds using the denormalized depth values and the pixel locations in the data vectors for which the new depth values were generated (operation 1502). The camera-centric coordinates are generated as follows:

$$Z^c = \sqrt{\frac{(d^c)^2}{u^2 + v^2 + 1}},$$

$$X^c = u \cdot Z^c,$$

and $$Y^c = v \cdot Z^c.$$

Thereafter, point locations for the new points in the three-dimensional reference coordinate system of the original point cloud are identified using the camera-centric coordinates (operation 1504), with the process terminating thereafter. The point locations in the three-dimensional reference coordinate system are identified using an inverse of the transformation algorithm used in operation 1200. For example, the point locations may be identified as follows:

$$\begin{bmatrix} X^p \\ Y^p \\ Z^p \\ 1 \end{bmatrix} = \begin{bmatrix} R_{11} & R_{12} & R_{13} & T^x \\ R_{21} & R_{22} & R_{23} & T^y \\ R_{31} & R_{32} & R_{33} & T^z \\ 0 & 0 & 0 & 1 \end{bmatrix}^{-1} \begin{bmatrix} X^c \\ Y^c \\ Z^c \\ 1 \end{bmatrix}$$

where $X^p$, $Y^p$, $Z^p$ are the coordinates for a new point to be added to the point cloud in the three-dimensional reference coordinate system and $X^C$, $Y^C$, $Z^C$ are the camera-centric coordinates for the new point in the three-dimensional camera-centric coordinate system.

The flowcharts in the different depicted embodiments illustrate the architecture, functionality, and operation of some possible implementations of the system and method described in the illustrative embodiments. In this regard, each block in the flowcharts may represent a module, a segment, a function, and/or a portion of an operation or step. For example, one or more of the blocks may be implemented using software, hardware, or a combination of the two. The hardware may, for example, take the form of integrated circuits that are manufactured or configured to perform one or more operations in the flowcharts.

In some alternative implementations of an illustrative embodiment, the function or functions noted in the blocks may occur out of the order noted in the figures. For example, in some cases, two blocks shown in succession may be executed substantially concurrently, or performed in the reverse order, depending on the particular implementation. Also, other blocks may be added to the illustrated blocks in a flowchart.

Turning now to FIG. 16, an illustration of a data processing system in the form of a block diagram is depicted in accordance with an illustrative embodiment. Data processing system 1600 may be used to implement one or more computers in computer system 104 in FIG. 1. Further, fusion manager 142, depth value generator 144, and/or point cloud manager 145 in FIG. 1 may be implemented using data processing system 1600. Still further, a data processing system similar to data processing system 1600 may be implemented within first sensor system 106 and/or second sensor system 108 in FIG. 1.

As depicted, data processing system 1600 includes communications framework 1602, which provides communications between processor unit 1604, storage devices 1606, communications unit 1608, input/output unit 1610, and display 1612. In some cases, communications framework 1602 may be implemented as a bus system.

Processor unit 1604 is configured to execute instructions for software to perform a number of operations. Processor unit 1604 may comprise a number of processors, a multi-processor core, and/or some other type of processor, depending on the implementation. In some cases, processor unit 1604 may take the form of a hardware unit, such as a circuit system, an application specific integrated circuit (ASIC), a programmable logic device, or some other suitable type of hardware unit.

Instructions for the operating system, applications, and/or programs run by processor unit 1604 may be located in storage devices 1606. Storage devices 1606 may be in communication with processor unit 1604 through communications framework 1602. As used herein, a storage device, also referred to as a computer readable storage device, is any piece of hardware capable of storing information on a temporary and/or permanent basis. This information may include, but is not limited to, data, program code, and/or other information.

Memory 1614 and persistent storage 1616 are examples of storage devices 1606. Memory 1614 may take the form of, for example, a random access memory or some type of volatile or non-volatile storage device. Persistent storage 1616 may comprise any number of components or devices. For example, persistent storage 1616 may comprise a hard drive, a flash memory, a rewritable optical disk, a rewritable magnetic tape, or some combination of the above. The media used by persistent storage 1616 may or may not be removable.

Communications unit 1608 allows data processing system 1600 to communicate with other data processing systems and/or devices. Communications unit 1608 may provide communications using physical and/or wireless communications links.

Input/output unit 1610 allows input to be received from and output to be sent to other devices connected to data processing system 1600. For example, input/output unit 1610 may allow user input to be received through a keyboard, a mouse, and/or some other type of input device. As another example, input/output unit 1610 may allow output to be sent to a printer connected to data processing system 1600.

Display 1612 is configured to display information to a user. Display 1612 may comprise, for example, without limitation, a monitor, a touch screen, a laser display, a holographic display, a virtual display device, and/or some other type of display device.

In this illustrative example, the processes of the different illustrative embodiments may be performed by processor unit 1604 using computer-implemented instructions. These instructions may be referred to as program code, computer usable program code, or computer readable program code and may be read and executed by one or more processors in processor unit 1604.

In these examples, program code 1618 is located in a functional form on computer readable media 1620, which is selectively removable, and may be loaded onto or transferred to data processing system 1600 for execution by processor unit 1604. Program code 1618 and computer readable media 1620 together form computer program product 1622. In this illustrative example, computer readable media 1620 may be computer readable storage media 1624 or computer readable signal media 1626.

Computer readable storage media 1624 is a physical or tangible storage device used to store program code 1618 rather than a medium that propagates or transmits program code 1618. Computer readable storage media 1624 may be, for example, without limitation, an optical or magnetic disk or a persistent storage device that is connected to data processing system 1600.

Alternatively, program code 1618 may be transferred to data processing system 1600 using computer readable signal media 1626. Computer readable signal media 1626 may be, for example, a propagated data signal containing program code 1618. This data signal may be an electromagnetic signal, an optical signal, and/or some other type of signal that can be transmitted over physical and/or wireless communications links.

The illustration of data processing system 1600 in FIG. 16 is not meant to provide architectural limitations to the manner in which the illustrative embodiments may be implemented. The different illustrative embodiments may be implemented in a data processing system that includes components in addition to or in place of those illustrated for data processing system 1600. Further, components shown in FIG. 16 may be varied from the illustrative examples shown.

The illustrative embodiments may be implemented using any hardware device or system capable of running program code. As one illustrative example, the data processing system may include organic components integrated with inorganic components and/or may be comprised entirely of organic components excluding a human being. For example, a storage device may be comprised of an organic semiconductor.

Thus, the illustrative embodiments provide a system and method for increasing the number of points in a point cloud. In one illustrative embodiment, a two-dimensional image and a point cloud of a same scene are received. At least a portion of the points in the point cloud are mapped to the two-dimensional image to form transformed points. A fused data array is created using the two-dimensional image and the transformed points. New points for the point cloud are identified using the fused data array. The new points are added to the point cloud to form a new point cloud.

The new point cloud formed using the image processing system described by the illustrative embodiments may allow a number of operations to be performed with a higher level of accuracy and/or efficiency as compared to the original point cloud. For example, object identification, object classification, segmentation, and/or other image processing operations may be performed more accurately using the new point cloud as compared to the original point cloud.

Further, the increased number of new points in the new point cloud may provide better visualization of the scene as compared to the original point cloud. Still further, the new point cloud may be used to better enhance the two-dimensional image as compared to the original point cloud.

The image processing system described by the different illustrative embodiments allows this new point cloud having an increased number of points to be formed without making any assumptions about the types of objects in the scene, about the shapes of objects in the scene, and/or about the background of the scene. In this manner, the process provided by the illustrative embodiments may form a new point cloud that more accurately represents the scene as compared to a process that makes assumptions about the scene to increase the number of points in the point cloud.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for improved resolution and accuracy of an object in a scene in a point cloud, comprising:
   an image processing system comprising a processor configured to:
   receive a two-dimensional image of a scene from a camera system and a point cloud of the scene having a first resolution from a light detection and ranging system;
   create transformed points by mapping point locations for a portion of points in the point cloud describing a three-dimensional representation of the scene to corresponding pixel locations in the two-dimensional image of the scene to form the transformed points;
   create a fused data array using the two-dimensional image and the transformed points, wherein each transformed point corresponds to a pixel in the two-dimensional image and to a matched element in a number of matched elements in the fused data array;
   calculate a goodness score using a combination of a distance of a transformed point mapped to a pixel corresponding to the matched element from the camera system, a dissimilarity of the matched element to other matched elements wherein the goodness score increases as the dissimilarity increases, and a depth value in a data vector associated with the matched element, wherein the goodness score is generated based on a relationship where:

$$G_i = \sqrt{M_i^2 + \Delta_i^2},$$

$$M_i = \frac{\sum_{j=1}^{n} \sqrt{(F_{1,i} - F_{i,j})^2 + \ldots + (F_{m,i} - F_{m,j})^2}}{n},$$

and $$\Delta_i = d_i^{\,o} \cdot \gamma,$$

wherein:
   $G_i$ is the goodness score of an $i^{th}$ matched element;
   $M_i$ is a dissimilarity score for the $i^{th}$ matched element;
   $\Delta_i$ is a distance measurement for the $i^{th}$ matched element;
   j is an index for an n matched elements;
   F is a response to a feature;
   m is a number of features;
   $d_i^{\,o}$ is the depth value in a data vector associated with the $i^{th}$ matched element; and
   $\gamma$ is a normalizing constant;
use the goodness score to identify a number of support elements; use the fused data array and the number of support elements to identify new points for the point cloud;
add the new points to the point cloud to form a new point cloud, wherein the new point cloud has a second resolution greater than the first resolution; and
identify the object in the scene using the new point cloud.

2. The apparatus of claim 1, wherein the fused data array comprises the matched elements that are associated with filled data vectors comprising non-null depth values, and unmatched elements that are associated with unfilled data vectors comprising null depth values.

3. The apparatus of claim 2, wherein the image processing system further comprises:
   a depth value generator configured to identify new depth values to replace at least a portion of the null depth values.

4. The apparatus of claim 3, wherein the image processing system further comprises:
a point cloud manager configured to identify the new points for the point cloud using the new depth values.

5. The apparatus of claim 4, wherein the point cloud manager is further configured to add the new points to the point cloud to form the new point cloud, and wherein the support elements and the new points represent an external surface of an object.

6. The apparatus of claim 1, wherein the fused data array is further comprised of elements, wherein each of the elements is associated with the data vector that comprises a pixel location in the pixel locations, the depth value, and original pixel data.

7. The apparatus of claim 1, wherein the image processing system is configured to map the at least a portion of the points in the point cloud to the two-dimensional image using pose information for the camera system.

8. An image processing system apparatus for improved resolution and accuracy of an object in a scene in a point cloud having a first resolution, comprising:
a fusion manager configured to map point locations for at least a portion of points in a point cloud of a scene to corresponding pixel locations in a two-dimensional image of the scene to form transformed points and configured to create a fused data array using the two-dimensional image and the transformed points, wherein each transformed point corresponds to a pixel in the image and to a matched element in a number of matched elements in the fused data array, wherein the fused data array includes the matched elements associated with filled data vectors comprising non-null depth values and unmatched elements associated with unfilled data vectors comprising null depth values; and
a depth value generator configured to:
identify a number of support elements in a portion of the fused data array using the matched element in the number of matched elements based on a goodness score generated for the matched elements, wherein the goodness score is based on a combination of a distance of a transformed point mapped to a pixel corresponding to the matched element from a camera system, a dissimilarity of the matched element to other matched elements wherein the goodness score increases as the dissimilarity increases, and a depth value in a the filled data vector associated with the matched elements, wherein the goodness score is generated based on a relationship where:

$G_i = \sqrt{M_i^2 + \Delta_i^2}$, $M_i = \dfrac{\sum_{j=1}^{n}\sqrt{(F_{1,i}-F_{1,j})^2+\ldots+(F_{m,i}-F_{m,j})^2}}{n}$, and $\Delta_i = d_i^\circ \cdot \gamma$, wherein:
$G_i$ is the goodness score of an $i^{th}$ matched element;
$M_i$ is a dissimilarity score for the $i^{th}$ matched element;
$\Delta_i$ is a distance measurement for the $i^{th}$ matched element;
j is an index for an n matched elements;
F is a response to a feature;
m is a number of features;
$d_i^\circ$ is the depth value in a data vector associated with the $i^{th}$ matched element; and
γ is a normalizing constant;
identify new depth values to replace at least a portion of the null depth values; and a point cloud manager configured to;
identify new points for the point cloud using the new depth values and the support elements and add the new points to the point cloud to form a new point cloud, wherein the new point cloud has a second resolution greater than the first resolution; and
to identify the object in the scene using the new point cloud.

9. A computer-implemented method for increasing a number of points in a point cloud for improved resolution and accuracy of an object in a scene in the point cloud, the computer-implemented method comprising:
receiving a two-dimensional image of the scene having the object and the point cloud of the scene having a first resolution;
mapping point locations for at least a portion of the points in the point cloud to corresponding pixel locations in the two-dimensional image to form transformed points;
creating a fused data array using the two-dimensional image and the transformed points, wherein each transformed point corresponds to a pixel in the image and to a matched element in a number of matched elements in the fused data array;
identify a number of support elements in a portion of the fused data array based on a goodness score generated for the matched elements;
wherein the goodness score is generated based on a relationship where:

$G_i = \sqrt{M_i^2 + \Delta_i^2}$, $M_i = \dfrac{\sum_{j=1}^{n}\sqrt{(F_{1,i}-F_{1,j})^2+\ldots+(F_{m,i}-F_{m,j})^2}}{n}$, and $\Delta_i = d_i^\circ \cdot \gamma$, wherein:
$G_i$ is the goodness score of an $i^{th}$ matched element;
$M_i$ is a dissimilarity score for the $i^{th}$ matched element;
$\Delta_i$ is a distance measurement for the $i^{th}$ matched element;
j is an index for an n matched elements;
F is a response to a feature;
m is a number of features;
$d_i^\circ$ is the depth value in a data vector associated with the $i^{th}$ matched element; and
γ is a normalizing constant;
identifying new points for the point cloud using the fused data array and the support elements;
adding the new points to the point cloud to form a new point cloud, wherein the new point cloud has a second resolution greater than the first resolution; and
identify the object in the scene using the new point cloud.

10. The computer-implemented method of claim 9, wherein mapping the at least a portion of the points in the point cloud to the two-dimensional image to form the transformed points comprises:

identifying pose information for a camera system;

transforming a three-dimensional reference coordinate system for the point cloud to a three-dimensional camera-centric coordinate system using the pose information to identify camera-centric coordinates for the points in the point cloud; and mapping the at least a portion of the points in the point cloud having the camera-centric coordinates to the pixel locations in the two-dimensional image.

11. The computer-implemented method of claim 9, wherein creating the fused data array using the two-dimensional image and the transformed points comprises:

forming the fused data array, wherein the fused data array is comprised of elements having a one-to-one correspondence with pixels in the two-dimensional image; and associating data vectors with the elements in the fused data array, wherein the data vectors include filled data vectors comprising non-null depth values and unfilled data vectors comprising null depth values.

12. The computer-implemented method of claim 11, wherein identifying the new points for the point cloud using the fused data array comprises:

generating new depth values to replace at least a portion of the null depth values; and identifying the new points for the point cloud using the new depth values, wherein the support elements and the new points represent an external surface of an object.

13. The computer-implemented method of claim 12, wherein generating the new depth values to replace the at least a portion of the null depth values comprises:

centering a window at a location of an element in the fused data array, wherein the element is associated with an unfilled data vector comprising a null depth value;

identifying support elements in a portion of the fused data array overlapped by the window; and generating a new depth value to replace the null depth value using the support elements and a linear estimation algorithm.

14. The computer-implemented method of claim 13, wherein identifying the support elements in the portion of the fused data array overlapped by the window comprises:

determining whether the matched elements in the portion of the fused data array overlapped by the window meet selected criteria;

responsive to the matched elements meeting the selected criteria, scoring each of the matched elements with a preselected goodness score;

sorting the matched elements by the preselected goodness score; and selecting a portion of the matched elements as the support elements.

15. The computer-implemented method of claim 13 further comprising:

repeating the steps of centering the window at the location of the element in the fused data array, identifying the support elements in the portion of the fused data array overlapped by the window, and generating the new depth value to replace the null depth value using the support elements and the linear estimation algorithm for each location in the fused data array.

16. The computer-implemented method of claim 12, wherein identifying the new points for the point cloud using the new depth values comprises:

identifying camera-centric coordinates within a three-dimensional camera-centric coordinate system for the new points using the new depth values; and transforming the camera-centric coordinates to point locations within a three-dimensional reference coordinate system for the point cloud to form the new points.

17. The computer-implemented method of claim 12, wherein generating the new depth values to replace the at least a portion of the null depth values comprises:

processing the fused data array using windows to generate the new depth values.

* * * * *

UNITED STATES PATENT AND TRADEMARK OFFICE
CERTIFICATE OF CORRECTION

PATENT NO. : 9,811,880 B2
APPLICATION NO. : 13/673429
DATED : November 7, 2017
INVENTOR(S) : Terrell Nathan Mundhenk, Yuri Owechko and Kyungnam Kim It is certified that error appears in the above-identified patent and that said Letters Patent is hereby corrected as shown below:

In the Claims

Column 20, Line 30, Claim 1 change "Fi,j" to --F1,j--
Column 21, Line 46, Claim 8 delete "the" first occurrence Signed and Sealed this
Twenty-ninth Day of May, 2018

Andrei Iancu
*Director of the United States Patent and Trademark Office*